United States Patent
Igarashi et al.

(10) Patent No.: US 9,207,654 B2
(45) Date of Patent: Dec. 8, 2015

(54) SERVO CONTROLLER

(75) Inventors: Yuji Igarashi, Tokyo (JP); Hidetoshi Ikeda, Tokyo (JP); Kiyoshi Maekawa, Tokyo (JP); Takashi Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 385 days.

(21) Appl. No.: 13/641,888

(22) PCT Filed: Apr. 25, 2011

(86) PCT No.: PCT/JP2011/060018
§ 371 (c)(1),
(2), (4) Date: Oct. 18, 2012

(87) PCT Pub. No.: WO2011/136160
PCT Pub. Date: Nov. 3, 2011

(65) Prior Publication Data
US 2013/0035914 A1   Feb. 7, 2013

(30) Foreign Application Priority Data

Apr. 26, 2010   (JP) ................................. 2010-101220

(51) Int. Cl.
*G06F 7/60* (2006.01)
*G05B 13/04* (2006.01)

(52) U.S. Cl.
CPC .... *G05B 13/041* (2013.01); *G05B 2219/42155* (2013.01); *G05B 2219/42157* (2013.01); *G05B 2219/42162* (2013.01)

(58) Field of Classification Search
CPC ...... G05B 13/042; G05B 13/00; G05B 13/02; G05B 13/04; G05B 13/048; G05B 19/404; G05B 2219/41163; G05B 2219/42155; G05B 2219/42157; G05B 2219/42162; G05B 5/01; G05B 17/02; G11B 5/59622; G11B 21/10; G11B 5/05; G06F 17/5018; G06F 17/5036; G06F 17/5009; G06F 2217/16
USPC .................... 703/2, 1; 700/28, 30, 32, 47, 48; 360/77.02, 78.09, 77; 318/560, 501
See application file for complete search history.

(56) References Cited

U.S. PATENT DOCUMENTS

| | | | | |
|---|---|---|---|---|
| 5,675,450 A * | 10/1997 | Kadlec | ......................... | 360/78.09 |
| 5,754,358 A * | 5/1998 | Yatsu | ......................... | 360/78.09 |
| 5,936,792 A * | 8/1999 | Kobayashi et al. | ......... | 360/78.07 |
| 7,181,294 B2 * | 2/2007 | Nihei et al. | ..................... | 700/30 |
| RE40,545 E * | 10/2008 | Ioannou et al. | ............. | 360/77.06 |
| 2006/0072391 A1* | 4/2006 | Zhou | ......................... | 369/44.32 |
| 2010/0100248 A1* | 4/2010 | Minto et al. | .................. | 700/287 |

FOREIGN PATENT DOCUMENTS

| | | |
|---|---|---|
| JP | 8 297512 | 11/1996 |
| JP | 2002 186269 | 6/2002 |
| JP | 2003 259674 | 9/2003 |
| JP | 2005 285030 | 10/2005 |
| JP | 2008 97334 | 4/2008 |

OTHER PUBLICATIONS

Peterson, D., What is a Vector, Jan. 4, 2002 http://mathforum.org/library/drmath/view/55466.html.*
U.S. Appl. No. 14/356,229, filed May, 5, 2014, Igarashi, et al.
International Search Report Issued May 24, 2011 in PCT/JP11/60018 Filed Apr. 25, 2011.

* cited by examiner

*Primary Examiner* — Kamini S Shah
*Assistant Examiner* — Brian S Cook
(74) *Attorney, Agent, or Firm* — Oblon, McClelland, Maier & Neustadt, L.L.P.

(57) ABSTRACT

A servo controller is provided. The servo controller includes a reference model unit which inputs a reference to generate a model output and a model input; a feedback control unit which generates a feedback input so that a control output of a plant follows the model output; and an adder which adds the model input and the feedback input. The reference model unit includes a mathematical model which simulates characteristics of the plant, and generates the model output and a state variable from the model input; a model input memory which outputs a past model input; a model controller which inputs the reference, the state variable, and the past model input to generate the model input; and a model controller determining unit which determines the model controller based on the reference, the state variable, and the past model input.

15 Claims, 10 Drawing Sheets

SERVO CONTROLLER

TECHNICAL FIELD

The present invention relates to a servo controller capable of controlling a plant so that the plant follows quickly and precisely.

BACKGROUND ART

Servo controllers in general are demanded to follow a command quickly and precisely and, in order to accomplish this, use two-degrees-of-freedom control which combines feed-forward control and feedback control. However, there are limitations in torque and other forms of control input that an actuator such as a motor can generate. In addition, there are limitations in the rate of change of control input, which is related closely to a voltage generated in a servo controller and, when increased, causes the voltage to rise to the point of voltage saturation and also magnifies shock to the mechanical system. Desired control is therefore to achieve quick, precise following to a reference while staying within the limitations of control input in terms of saturation and rate of change.

On the other hand, when characteristics in following to a reference are constant, the limitations of control input in terms of saturation and rate of change pose a problem in varying degrees depending on how large/small and how rapid a change to the reference is. In particular, controlling a vibratory plant which has mechanical resonance so that vibrations excited in following a command are actively cancelled has a problem of increasing control input and the rate of change of control input to excess, thereby facilitating saturation.

A conventional servo controller described in Patent Literature 1 has the configuration of a two-degrees-of-freedom control system and includes, in a feed-forward control unit, a mathematical model approximating a plant, FF position control, and FF speed/stabilization control. The FF position control uses position proportional control of a fixed gain or a predictive controller that utilizes command prefetching. The FF speed/stabilization control is constituted of speed PI control and state feedback of a mathematical model whose gains are fixed.

A conventional servo controller described in Patent Literature 2 includes switches to improve its performance by employing feedback control that uses a predictive controller as a feedback controller, or two-degrees-of-freedom control, when the switches are turned on, and switching to feedback control that involves position proportional control alone when the switching switches are turned off. In this conventional example, the switching switches are turned on when a plant requires precise following characteristics, and are turned off when the targeted command increment value is changed. The conventional example also involves linear interpolation of control input before and after switching which is performed by a filter function part in order to give continuous values to control input before and after switching.

CITATION LIST

Patent Literature

[PTL 1] JP 2003-259674 A
[PTL 2] JP 2005-285030 A

SUMMARY OF INVENTION

Technical Problem

Patent Literature 1 described above discloses a two-degrees-of-freedom control-type servo controller which includes, in a feed-forward control unit, a mathematical model approximating a plant, FF position control, and FF speed/stabilization control. This device has a problem in that, when fixed gains are used in the FF position control and the FF speed/stabilization control, accomplishing as quick and precise control as possible within the limitations of control input in terms of magnitude and rate of change is difficult in the face of various command changes. In the case where the conventional servo controller of Patent Literature 1 uses predictive control, too, the controller has fixed characteristics and, although an effect of causing quick following in general is obtained, it is therefore still difficult to accomplish quick, precise control in the face of various command changes while taking into account the magnitude and rate of change of control input.

Patent Literature 2 discloses a servo controller that achieves high performance by switching controllers. This device has a problem in that improving speed and precision is difficult in the face of various command changes because simply turning the switches on when a plant requires precision and turning the switching switches off when the targeted command increment value is changed is not enough to switch controllers in a manner that takes into account the limitations of torque in terms of saturation and rate of change. Another problem is that switching gives discontinuous values to control input and resultantly causes a shock. Still another problem is that, although a technology of using a filter function part for interpolation of control input before and after switching is disclosed, the characteristics of the plant are not taken into consideration during interpolation, and it is therefore difficult to improve precision.

The present invention has been made to solve the problems described above, and an object of the present invention is to obtain a servo controller capable of causing a plant to follow quickly and precisely to an arbitrary reference without causing control input saturation and saturation of the rate of change of control input.

Solution to Problem

According to the present invention, there is provided a servo controller, including: a reference model unit which inputs a reference to generate a model output and a model input; a feedback control unit which generates a feedback input so that a control output of a plant follows the model output; and an adder which adds the model input and the feedback input to generate a control input to be input to the plant, in which the reference model unit includes: a mathematical model which simulates characteristics of the plant, and generates the model output and a state variable from the model input; a model input memory which inputs the model input and which outputs, as a past model input, a stored signal of the model input of past; a model controller which inputs the reference, the state variable, and the past model input to generate the model input; and a model controller determining unit which determines the model controller based on the reference, the state variable, and the past model input.

Advantageous Effects of Invention

According to the servo controller of the present invention, the characteristics of a controller are varied automatically in response to commands in various forms while taking into account the magnitude and rate of change of control input, to thereby cause a plant to follow quickly and precisely.

DESCRIPTION OF EMBODIMENTS

Servo controllers according to preferred embodiments of the present invention are described below with reference to the drawings.

First Embodiment

Figure 1:
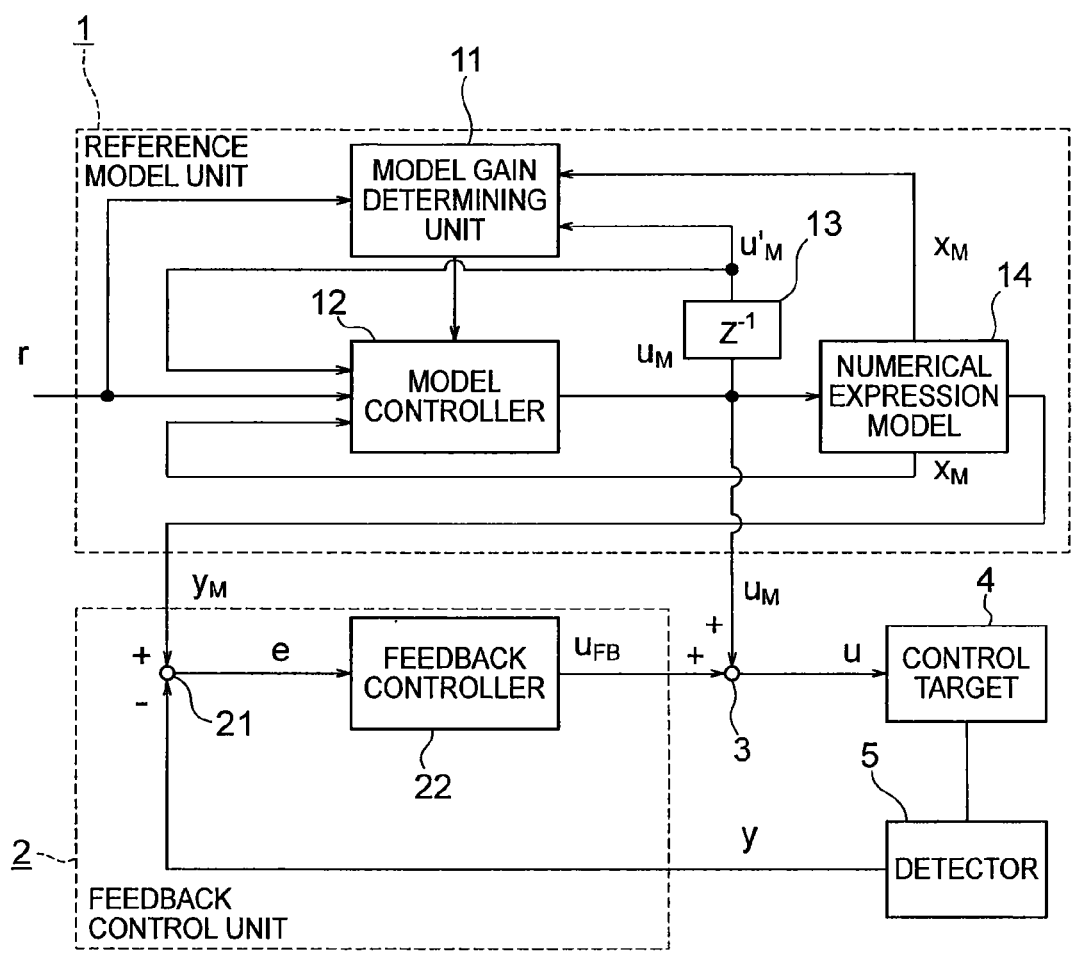
FIG. 1 A block diagram illustrating the configuration of a servo controller according to a first embodiment of the present invention.

A servo controller according to a first embodiment of the present invention is described with reference to FIGS. 1 to 3. FIG. 1 is a block diagram illustrating the configuration of the servo controller according to the first embodiment of the present invention. In the following, the same symbols represent the same or equivalent components throughout the drawings.

In FIG. 1, the servo controller according to the first embodiment of the present invention includes a reference model unit 1, a feedback control unit 2, an adder 3, and a detector 5 for detecting a control output of a plant 4.

The plant 4 is constituted of a mechanical load and a driving actuator such as a motor. The detector 5 is an encoder, a linear scale, or the like.

The reference model unit 1 includes a model gain determining unit 11 for determining a model gain of a model controller, which is described later, a model controller 12 for controlling a model output so that the model output follows to a reference, a model input memory 13 for storing a model input, and a mathematical model 14 simulating the characteristics of the plant 4. In this embodiment, the characteristics of the model controller are switched by changing the model gain which is a numerical vector of the model controller. A model controller determining unit in this embodiment is referred to as model gain determining unit in order to explicitly express that the unit switches the model gain.

The feedback control unit 2 includes a subtracter 21 and a feedback controller 22.

The model controller 12 includes a sub-model controller 121 and an adder 122.

The operation of the servo controller according to the first embodiment is now described with reference to the drawings.

The servo controller according to the first embodiment inputs a reference r for a control output which indicates the position and speed of a machine to be driven and a control output y of the plant 4 which indicates the position and speed of a motor detected by the detector 5, and outputs a control input u in the form of current or the like for causing the motor to generate desired torque to the plant 4 so that the control output y follows to the reference r.

The reference model unit 1 inputs the reference r, outputs a model output $y_M$ of the mathematical model 14 which indicates an ideal operation of the plant 4 to the feedback control unit 2, and outputs a model input $u_M$ to the adder 3. The feedback control unit 2 inputs the model output $y_M$ which is output from the reference model unit 1 and the control output y of the plant 4 which is output from the detector 5, and outputs a feedback input $u_{FB}$ to the adder 3. The adder 3 adds the model input $u_M$ output from the reference model unit 1 and the feedback input $u_{FB}$ output from the feedback control unit 2, and outputs the sum to the plant 4 as a control input u. The plant 4 is driven with the control input u output from the adder 3, and the control output y of the plant 4 is detected by the detector 5.

The components of the reference model unit 1 are respectively outlined next.

First, the model gain determining unit 11 inputs the reference r, a state variable $x_M$ of the mathematical model 14, and a past model input $u_M'$, which is described later. From those values, the model gain determining unit 11 determines a model gain of, or a model gain and model offset of, the model controller 12 that do not make the absolute values of the model input $u_M$ and a model input change rate $\Delta u_M$ larger than given values, and outputs the model gain or the model gain and model offset to the model controller 12. In other words, when the absolute value of the model input $u_M$ is about to exceed a given value, this model gain determining unit 11 changes the model gain and the model offset so that the sub-model controller 121 generates such model input change rate $\Delta u_M$ that the absolute value of the model input $u_M$ becomes smaller. The model gain and the model offset are also determined so that the absolute value of the model input change rate $\Delta u_M$ does not become a given value or larger. This prevents the model input and the model input change rate from becoming certain levels or larger and simultaneously prevents control input and the rate of change of control input from becoming certain levels or larger.

The model controller 12 inputs the reference r, the past model input $u_M'$, which is output from the model input memory 13, and the state variable $x_M$ of the mathematical model 14. The model controller 12 uses those input values and the model gain, or the model gain and the model offset, that the model gain determining unit 11 outputs to perform state feedback. In other words, based on the multiplication of those input values by the model gain, or on the multiplication of those input values by the model gain and the addition of the model offset, the model controller 12 calculates the model input $u_M$ so that the model output $y_M$ of the mathematical model 14 equals to the reference r, and outputs the calculated model input $u_M$.

The model input memory 13 inputs the model input $u_M$ output from the model controller 12, and stores the model input $u_M$ for a given period of time. The stored model input $u_M$ is then output as the past model input $u_M{}'$ to the model gain determining unit 11 and the model controller 12.

The mathematical model 14 which simulates the characteristics of the plant 4 inputs the model input $u_M$ calculated by the model controller 12, outputs the state variable $x_M$ to the model gain determining unit 11 and the model controller 12, and outputs the model output $y_M$ to the feedback control unit 2. The state variable $x_M$ indicates the internal state of the mathematical model 14, and is an n-th order numerical vector (n is equal to or larger than 1). The model output $y_M$ is a part of the state variable of the mathematical model 14 that corresponds to an actually measurable physical quantity of the plant 4, such as motor position or motor speed, or both. The dimension thereof is written as m.

The feedback control unit 2 is described next.

The feedback control unit 2 inputs the model output $y_M$ which is output from the reference model unit 1 and the control output y of the plant 4 which is detected by the detector 5, and calculates the feedback control input $u_{FB}$ so that the control output y follows the model output $y_M$. The calculated feedback control input $u_{FB}$ is output to the adder 3.

The components of the feedback control unit 2 are respectively described.

The subtracter 21 inputs the model output $y_M$ and the control output y of the plant 4 which is detected by the detector 5, calculates an output deviation e from those values, and outputs the output deviation e to the feedback controller 22. In the case where the model output $y_M$ and the control output y of the plant 4 are numerical vectors such as position and speed both, the output deviation e is a numerical vector as well. The dimension thereof is m.

The feedback controller 22 inputs the output deviation e output from the subtracter 21, and calculates the feedback input $u_{FB}$ so that the output deviation e becomes 0, in other words, so that the control output y follows the model output $y_M$. The feedback controller 22 then outputs the calculated feedback input $u_{FB}$ to the adder 3. The feedback controller 22 can use such control methods as position P/speed PI control, PID control, H ∞ control, μ synthesis, adaptive control, and sliding mode control, and is not limited to a particular method here.

The adder 3 calculates the control input u by adding the feedback input $u_{FB}$ which is calculated by the feedback controller 22 and the model input $u_M$ which is calculated by the model controller 12. The control input u is used to drive the plant 4 so that the control output y of the plant 4 equals to the reference r. With this, the plant 4 follows to the reference and operates as desired.

A detailed description is given next of the respective operations of the components of the reference model unit 1. The following description deals with a case where the model input of one step prior is used as the past model input $u_M{}'$ in order to simplify the description. The same symbol is used for the past model input and for the model input of one step prior. However, the past model input that can be used is not limited to the model input of one step prior.

Based on the model input $u_M$ which is input to the mathematical model 14, the state variable $x_M$ and the model output $y_M$ are calculated by a discrete-time state equation of the following Expression (1).

[Math. 1]

$$xM(k+1)=AxM(k)+BuM(k)$$

$$yM(k)=CxM(k)+DuM(k) \quad (1)$$

Here, the following is established.

[Math. 2]

$$xM(k)\in R^{n\times 1}, uM(k)\in R^{1\times 1}, yM(k)\in R^{m\times 1}$$

The items given above are matrices that respectively indicate the state variable of the mathematical model, the model input, and the model output at a k-th step, n represents the number of states, and m represents the number of outputs.

[Math. 3]

$$A\in R^{n\times n}, B\in R^{n\times 1}, C\in R^{m\times n}, D\in R^{M\times 1}$$

The items given above are matrices indicating the characteristics of the mathematical model 14. The elements A, B, C, and D are also determined so as to represent the characteristics of the plant 4. However, the mathematical model 14 does not need to indicate all of the characteristics of the plant 4, and only needs to indicate some of the characteristics.

An example of the mathematical model 14 is described. FIG. 2 is a diagram illustrating a two-inertia system model which is an example of the mathematical model of the servo controller according to the first embodiment of the present invention.

Figure 2:
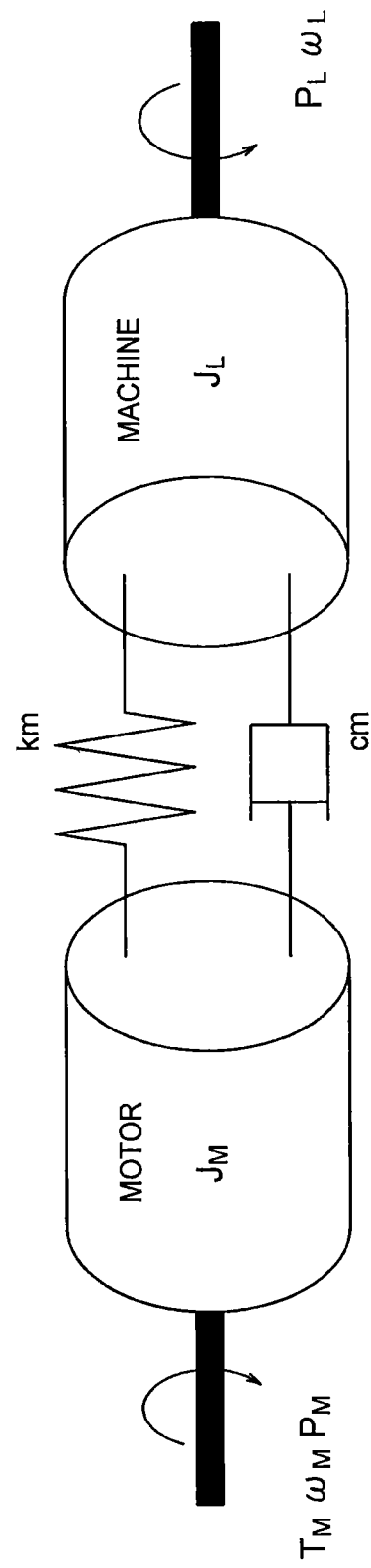
FIG. 2 A diagram illustrating a two-inertia system model which is an example of a mathematical model of the servo controller according to the first embodiment of the present invention.

A case is discussed as an example where the mathematical model 14 is a two-inertia model with a motor as the one illustrated in FIG. 2 driving a mechanical load via a spring when the characteristics of the plant 4 have a plurality of resonance points and antiresonance points, and only the characteristics of resonance points and antiresonance points present in the lowest range are considered. With the use of the mathematical model 14 that models a vibratory mechanical system, a control system highly capable of suppressing vibrations is obtained. The assumption here is that motor position and motor speed can be measured with the use of the detector 5. The state equation of a continuous system of the two-inertia system model of FIG. 2 is expressed by Expression (2) and Expression (3).

[Math. 4]

$$\frac{d}{dt}\begin{bmatrix} pM \\ \omega M \\ pL \\ \omega L \end{bmatrix} = \begin{bmatrix} 0 & 1 & 0 & 0 \\ -k_m/J_M & -c_m/J_M & k_m/J_M & c_m/J_M \\ 0 & 0 & 0 & 1 \\ k_m/J_L & c_m/J_L & -k_m/J_L & -c_m/J_L \end{bmatrix}\begin{bmatrix} pM \\ \omega M \\ pL \\ \omega L \end{bmatrix} + \begin{bmatrix} 0 \\ 1/J_M \\ 0 \\ 0 \end{bmatrix}TM \quad (2)$$

$$yM = \begin{bmatrix} 1 & 0 & 0 & 0 \\ 0 & 1 & 0 & 0 \end{bmatrix}\begin{bmatrix} pM \\ \omega M \\ pL \\ \omega L \end{bmatrix} \quad (3)$$

In Expression (2) and Expression (3), pM represents a motor position, ωM represents a motor speed, pL represents a mechanical load position, ωL represents a mechanical load speed, $J_M$ represents the inertia moment of the motor, $J_L$ represents the inertia moment of the mechanical load, TM represents a motor torque, km represents a spring constant, cm represents a viscosity coefficient, and d/dt represents differentiation concerning time.

Because the mathematical model 14 is actually a linear discrete-time system, Expression (2) and Expression (3) are discretized to obtain a discrete-time state equation, which serves as the mathematical model 14. In this case, the state variable $x_M$ of FIG. 2 equals the motor position pM(k), the motor speed ωM(k), the mechanical load position pL(k), and the mechanical load speed ωL(k) at each sampling point as in Expression (4), and the model input $u_M$ equals the motor torque TM(k). The model output $y_M$ in this embodiment, where it is assumed that the motor position pM and the motor speed ωM can be measured, equals the motor position pM(k) and the motor speed ωM(k) in Expression (4). In Expression (4), k represents the number of steps.

[Math. 5]

$$xM(k) = \begin{bmatrix} pM(k) \\ \omega M(k) \\ pL(k) \\ \omega L(k) \end{bmatrix}, \qquad (4)$$

$$uM(k) = TM(k), \; yM(k) = \begin{bmatrix} pM(k) \\ \omega M(k) \end{bmatrix}$$

Described here is an example of the mathematical model 14, which is to say that the mathematical model 14 should not be limited to Expression (2) and Expression (3) and that the state variable $x_M$, the model input $u_M$, and the model output $y_M$ should not be limited to Expression (4).

Details of the reference model unit 1, which has already been outlined, are described next. The operation of the model controller 12 in the reference model unit 1 is described first in detail. A configuration example of the model controller 12 which is used in the description of the operation is illustrated in FIG. 3.

The model controller 12 inputs the reference r, the model input $u_M'$ of one step prior, and the state variable $x_M$ of the mathematical model 14, and obtains a model gain selected by the model gain determining unit 11 and a model offset described later.

The sub-model controller 121 outputs, as the model input change rate $\Delta u_M$, a calculation result based on the multiplication of the reference r, the model input $u_M'$ of one step prior, and the state variable $x_M$ of the mathematical model 14 by the model gain, and the addition of the model offset thereto. Adding the model offset improves control performance. The calculation of the sub-model controller 121 can be expressed by Expression (5).

[Math. 6]

$$\Delta uM(k) = Ki \begin{bmatrix} xM(k) \\ uM(k-1) \end{bmatrix} + Gi + Kr(k) \qquad (5)$$

In Expression (5), Ki represents the model gain and Gi represents the model offset to be added further to a result of the multiplication of the reference r, the model input $u_M'$ of one step prior, and the state variable $x_M$ by the model gain Ki. The model offset Gi is not necessary in some cases but is introduced here because the model offset Gi is used in a description given below. The model gain Ki and the model offset Gi are input to the model controller 12 by the model gain determining unit 11. Although the term about the reference r is written separately in Expression (5), it is sufficient in practice if the model input change rate $\Delta u_M$ is generated from a deviation between the reference r and the state variable $x_M$ which follows. Again Kr of the reference r is determined automatically from the model gain Ki.

The adder 122 next outputs the model input $u_M$ by adding the model input change rate $\Delta u_M$ which is output by the sub-model controller 121 and the model input $u_M'$ of one step prior. In other words, the adder 122 outputs the model input $u_M$ by integrating the model input change rate $\Delta u_M$.

[Math. 7]

$$uM(k) = uM(k-1) + \Delta uM(k) \qquad (6)$$

The model controller 12 calculates in the manner described above, thereby calculating the model input change rate $\Delta u_M$ once in the sub-model controller 121, integrating the model input change rate $\Delta u_M$ through the operation of the adder 122, and outputting the model input $u_M$. This way, the model manipulation amount $u_M$ can be calculated without giving the model manipulation amount $u_M$ discontinuous values even when the calculation characteristics of the sub-model controller 121 are switched, as long as the switching does not make the model input change rate $\Delta u_M$ extremely high.

The model input change rate $\Delta u_M$ described above is regarded here as a new input, and an expanded system of the mathematical model which combines the mathematical model 14 with the adder 122 and the model input memory 13 is expressed as a discrete-time state equation of the following Expression (7). In Expression (7), I represents a unit matrix, 0 represents a zero matrix, and the numbers of rows and columns thereof are determined appropriately.

[Math. 8]

$$\begin{bmatrix} xM(k+1) \\ uM(k) \end{bmatrix} = \begin{bmatrix} A & B \\ 0 & I \end{bmatrix} \begin{bmatrix} xM(k) \\ uM(k-1) \end{bmatrix} + \begin{bmatrix} B \\ I \end{bmatrix} \Delta uM(k) \qquad (7)$$

$$yM(k) = \begin{bmatrix} C & D \end{bmatrix} \begin{bmatrix} xM(k) \\ uM(k-1) \end{bmatrix} + D\Delta uM(k)$$

Accordingly, the model gain Ki of the sub-model controller 121 can be designed so that the expanded system described above issues a stable and desired response. In addition, because the output of the model controller 12 itself is the model input change rate $\Delta u_M$, switching the calculation of the model controller 12 so as to constrain the model input change rate $\Delta u_M$ within a given range is accomplished with an easy operation as described later.

Figure 3:
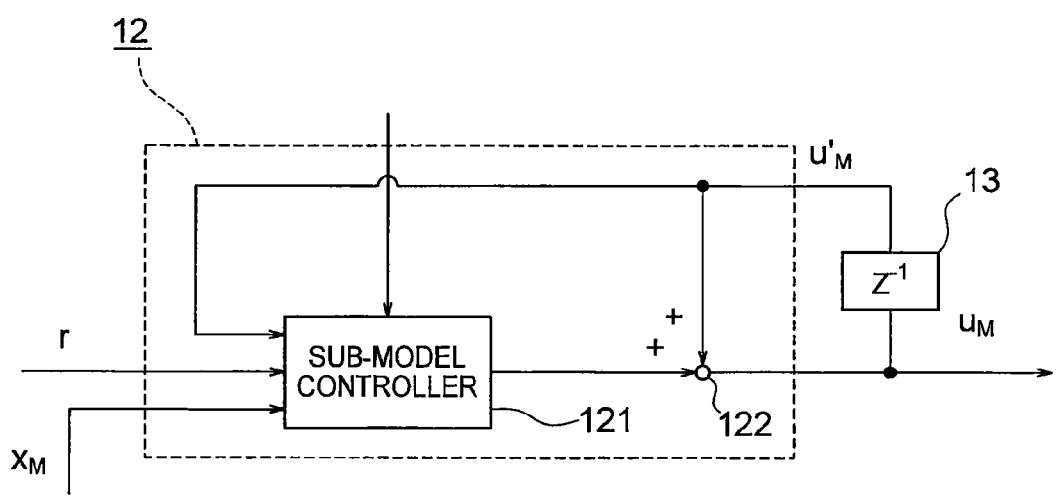
FIG. 3 A block diagram illustrating the configuration of a model controller of the servo controller according to the first embodiment of the present invention.

The concrete calculation method of the model controller 12 is not limited to the configuration of FIG. 3, and a calculation equivalent to the one described above can be performed by various other configurations. In other words, the model controller 12 can perform a calculation that directly takes into account the input change rate $\Delta u_M$ through a calculation equivalent to the one described above by basing the calculation on the reference r and the state variable $x_M$ of the mathematical model 14 and on the model input $u_M'$ of one step prior which is output by the model input memory 13.

Details of how the model gain determining unit 11 determines the model gain and the model offset are described next.

The model gain determining unit 11 changes the model gain Ki, or the model gain Ki and the model offset Gi, based on the reference r, the state variable $x_M$, and the model input $u_M{}^l$ of one step prior. Described here is a method of determining the model gain Ki and the model offset Gi with the use of a gain map and a gain offset map which describe the association relation of the reference r, the state variable $x_M$, and the model input $u_M{}^l$ of one step prior with the model gain Ki and the model offset Gi.

The gain map can be as follows. As candidates for the gain of the model input change rate $\Delta u_M(k)$, a high response gain and a low response gain are prepared first. The high response gain is used normally and is switched to the low response gain when the absolute value of the model input change rate $\Delta u_M(k)$ or the absolute value of the model input $u_M(k)$ is about to exceed a given value. How the high response gain and the low response gain are determined is not limited to a particular method. To give an example for reference, with the expanded system of Expression (7), pole assignment, loop shaping, or the like can be used to design the high response gain and the low response gain. The number of gains is also not limited to two based on whether the gain is high or low in response, and can be three or more.

In the example given above for reference, the number of model gains between which a switch is made and the respective model gains need to be designed by trial and error to some degree, and details of switching conditions need to be designed separately. In contrast, a plurality of model gains and switching conditions can be determined systematically by applying model predictive control as follows.

It is known in model predictive control to design a controller that switches gains and offsets by offline optimization calculation (F. Borrelli: Constrained Optimal Control of Linear and Hybrid Systems, Springer Verlag, LNCIS 290 (2003)).

The reference work cited above proposes, as a control method that is not limited to servo controllers, a method of staying within limitations and minimizing a certain evaluation function as well by utilizing model predictive control to design a piecewise-affine state feedback control system. The term "affine" means that a controller is based on the multiplication of a state by a gain and the addition of an offset thereto, and "piecewise" means that gains and offsets are switched depending on the state of the plant. However, in the reference, designed piecewise-affine state feedback needs to measure or estimate every state of the plant, and accordingly requires many sensors or needs to build an observer, which is not practical.

On the other hand, using this method to design the model controller 12 solves the problem described above. In addition, in the thus designed controller, the model input $u_M$ is determined based on the multiplication of a gain and the state of the plant and the addition of an offset thereto, and gains and offsets are switched depending on the state of the plant. Generating the gain map and the offset map by model predictive control is described below.

Designing a controller by model predictive control requires determining a model, control limitations, and an evaluation function, which are described next.

A model used in designing a controller is described first. In the first embodiment, the model input change rate $\Delta u_M$, too, is taken into account and the expanded form expressed by Expression (7) is therefore the model used in designing a controller.

Control limitations are described next. A control limitation in the first embodiment is that the model input $u_M(k)$ and the model input change rate $\Delta u_M(k)$ do not exceed given values at each step. In other words, a control limitation expressed as follows is laid down.

[Math. 9]

$$|uM(k)| \leq uM_{max}, |\Delta uM(k)| \leq \Delta uM_{max}, k=0,1,2,\ldots \quad (8)$$

In Expression (8), $uM_{max}$ represents the maximal absolute value of the model input $u_M(k)$, and $\Delta uM_{max}$ represents the maximal absolute value of the model input change rate $\Delta u_M(k)$.

Lastly, an evaluation function is described. The evaluation function in the first embodiment is expressed as follows.

[Math. 10]

$$\sum_{i=0}^{N-1}\left(\left\|Q\begin{bmatrix}xM(k+i)\\uM(k+i-1)\end{bmatrix}\right\|_d + \|R\Delta uM(k+i)\|_d\right) + \left\|P_N\begin{bmatrix}xM(k+N)\\uM(k+N-1)\end{bmatrix}\right\|_d \quad (9)$$

A problem of calculating the model input change rate $\Delta u_M(k)$ that minimizes the evaluation function of Expression (9) (Expression (10)) is considered.

[Math. 11]

$$\min_{\Delta uM(k),\ldots,\Delta uM(k+N-1)} \sum_{i=0}^{N-1}\left(\left\|Q\begin{bmatrix}xM(k+i)\\uM(k+i-1)\end{bmatrix}\right\|_d + \|R\Delta uM(k+i)\|d\right) + \left\|P_N\begin{bmatrix}xM(k+N)\\uM(k+N-1)\end{bmatrix}\right\|_d \quad (10)$$

subject to $|uM(k+i)| \leq uM_{max}$,
$|\Delta uM(k+i-1)| \leq \Delta uM_{max}$, $$\begin{bmatrix}xM(k+i+1)\\uM(k+i)\end{bmatrix} = \begin{bmatrix}A & B\\0 & I\end{bmatrix}\begin{bmatrix}xM(k+i)\\uM(k+i-1)\end{bmatrix} + \begin{bmatrix}B\\I\end{bmatrix}\Delta uM(k+i) \forall i \in [0, N-1]$$

In Expression (9) and Expression (10), d represents the order of a norm and takes one of values 1, 2, and $\infty$, N represents a parameter called a horizon which is one of design parameters and determines to what degree the future is predicted, and Q, R, and $P_N$ represent design parameters that are weights.

It is a known fact that the problem of minimizing the above evaluation function can be changed to a linear programming problem of Expression (11) when d is 1 or $\infty$ by an appropriate conversion and the introduction of an auxiliary variable with the use of certain matrices G, W, and E and a certain vector c.

[Math. 12]

$$\min_{v} c^T v \quad (11)$$

subject to $Gv \leq W + E\begin{bmatrix}xM(k)\\uM(k-1)\end{bmatrix}$

In Expression (11), $x_M(k)$ represents the state variable at the k-th step, $u_M(k-1)$ represents the model input of one step prior, and v is constituted of an input sequence $[\Delta u_M(k), \ldots, \Delta u_M(k+N-1)]$ and an auxiliary variable.

By solving the optimal problem of Expression (11), the model gain Ki and the model offset Gi are obtained which are each switched depending on the state variable $x_M(k)$ of the mathematical model 14 and the model input $u_M(k-1)$ of one step prior. At the same time, a switching condition Pi of the model gain Ki and the model offset Gi is obtained. The condition Pi corresponds to the maps (the gain map and the offset map). The obtained model gain Ki, model offset Gi, and switching condition Pi are used to calculate Expression (12), Expression (13), and Expression (14), and the model input change rate $\Delta u_M(k)$ is thus calculated.

[Math. 13]

$$\Delta uM(k) = Ki \begin{bmatrix} xM(k) \\ uM(k-1) \end{bmatrix} + Gi \qquad (12)$$

$$\text{if } \begin{bmatrix} xM(k) \\ uM(k-1) \end{bmatrix} \in Pi \qquad (13)$$

$$uM(k) = uM(k-1) + \Delta uM(k) \qquad (14)$$

In other words, the values of the model gain Ki and the model offset Gi are automatically designed as well as the map Pi which associates the state variable $x_M(k)$ of the mathematical model 14 and the model input $u_M(k-1)$ of one step prior with the model gain Ki and the model offset Gi.

The model gain determining unit 11 therefore has a map that is obtained as a result of solving the optimal problem of Expression (11), and obtains the state variable $x_M(k)$ of the mathematical model 14, the model input $u_M(k-1)$ of one step prior, and the reference r at each step. The model gain determining unit 11 refers to the map with the use of the value of the state variable $x_M$ and the model input $u_M'$ of one step prior, to thereby select the model gain Ki and the model offset Gi. The selected model gain Ki and model offset Gi are output to the model controller 12.

The model controller 12 calculates as described above the model input $u_M(k)$ based on the multiplication of the state variable $x_M(k)$ of the mathematical model 14 and the model input $u_M'$ of one step prior, namely, the model input $u_M(k-1)$, by the model gain Ki and the addition of the model offset Gi thereto as in Expression (12), Expression (13), and Expression (14). As described above, a deviation between the reference r and the state variable $x_M$ can be used in practice to perform control equivalent to Expression (12), Expression (13), and Expression (14) for enabling a plant to follow to the reference r. A gain of the reference r in this case can be calculated automatically from Ki.

The model input $u_M(k)$ and model input change rate $\Delta u_M(k)$ of Expression (12), Expression (13), and Expression (14) are derived as a result of the optimization calculation of Expression (10) and Expression (11). The derived model input $u_M(k)$ and model input change rate $\Delta u_M(k)$ are therefore within the limitation (8) of the optimization calculation. In other words, the model gain Ki and the model offset Gi are each switched when the absolute values of the model input $u_M$ and the model input change rate $\Delta u_M$ are equal to or larger than given values. A map describing a condition for switching the model gain Ki and the model offset Gi is also calculated automatically. That the model input $u_M$ does not become equal to or higher than a certain level means that input saturation can be prevented, and that the model input change rate $\Delta u_M$ does not become equal to or higher than a certain level means that changing the model gain Ki and the model offset Gi based on the map described above does not cause a rapid change in model input $u_M(k)$.

When the model offset Gi which is derived as a result of solving the optimization problem of (10) and (11) is added, the evaluation function of Expression (9) is smaller than when the model gain Ki is used alone, and a quick, precise control system is obtained in that regard.

The description given next is about effects of the first embodiment described above.

The servo controller according to the first embodiment uses a past model input to determine a model gain, and thus takes into account the rate of change of model input, or the rate of change of control input, in determining a model gain. Specifically, the past model input $u_M'$ is used to generate the model input $u_M$, and it is therefore possible to use the model input change rate $\Delta u_M$ as a new input. As a result, a control system that does not allow the model input change rate $\Delta u_M$, as well as the model input $u_M$, to exceed a given value is realized with ease by changing the model gain appropriately. In other words, the obtained servo controller exhibits high performance while preventing torque saturation and torque change rate saturation, and voltage saturation which is closely related to the rate of change of torque. The obtained servo controller is also capable of preventing a rapid change in model input $u_M$ when the model gain is switched to improve control performance.

Further, feeding the past model input $u_M'$ back to the model controller 12 to use the model input change rate $\Delta u_M$ as a new input accomplishes an equivalent conversion to the expanded system of Expression (7) in which the state variable $x_M$ and the past model input $u_M'$ are fed back. With this, it is possible to take the model input change rate $\Delta u_M$ into account in optimization calculation. In addition, the model gain determining unit 11 uses the past model input $u_M'$, the state variable $x_M$ of the mathematical model 14, and the reference r to switch the model gain Ki and the model offset Gi, thereby enabling the resultant servo controller to respond quickly and precisely while staying within the model input limitation $|u_M| \leq uM_{max}$ and the model input change rate limitation $|\Delta u_M| \leq \Delta uM_{max}$.

The gain map and the offset map which are for changing the model gain Ki and the model offset Gi are obtained in advance by offline calculation, and online calculation is performed only for determining the model gain Ki and the model offset Gi through reference to the maps, for multiplying the past model input $u_M'$, the state variable $x_M$ of the mathematical model 14, and the reference r by the model gain Ki obtained through reference to the maps, and for adding the model offset Gi. Defining the gain map and the offset map in advance reduces the amount of online calculation significantly and shortens the sampling time even more. In the case where the reference r, too, is used to calculate model input as in Expression (5), the calculation of the model gain Kr and the multiplication of the reference r by the model gain Kr are added thereto. In other words, numerical optimization is not performed at each step, and the calculation time is therefore shorter than in model predictive control where optimization calculation is performed at each step, and accordingly it is possible to cut short the sampling time. Therefore, a control system whose sampling time and control cycle are too short to complete numerical optimization calculation online, too, can have the same performance as in model predictive control and can make consideration for limitations. Moreover, with the sampling time shortened, the control system is improved in performance.

In the first embodiment, a switching type control system is built inside the reference model unit 1. The model gain can therefore be switched without minding stability, unlike the case of switching the gain and the like of the feedback controller 22.

The first embodiment deals with the case where d is 1 or ∞. However, when d is 2, the only difference is that the multi-parametric linear programming program is replaced with a multi-parametric second order programming problem and, ultimately, the model input change rate $\Delta u_M$ that causes the model gain Ki and the model offset Gi to switch is generated.

The description given above deals with a case where the model gain determining unit 11 uses the gain map to switch the model gain or a case where the model gain determining unit 11 uses the gain map and the offset map to switch the model gain and the model offset. Alternatively, the model gain and the model offset may be calculated with the use of a function that has the state variable $x_M$ of the mathematical model 14, the reference r, and the past model input $u_M'$ as variables.

In the description given above, the model input saturation $|u_M| \leq uM_{max}$ and the model input change rate saturation $|\Delta u_M| \leq \Delta uM_{max}$ are used as control limitations, but control limitations are not limited thereto. Specifically, it is sufficient if control limitations about the state variable $x_M$ of the mathematical model 14, the model input $u_M$, and the model input change rate $\Delta u_M$ are convex constraints. For example, a control limitation may be put on the state variable $x_M$ of the mathematical model 14 as well.

When determining the model gain, or the model gain and the model offset, it is not necessary to use all of the state variable $x_M$ of the mathematical model 14, the reference r, and the past model input $u_M'$, and using just some of these pieces of information suffices.

The feedback controller 22 inputs the output deviation e between the model output $y_M$ and the control output y of the plant 4 ($e=y_M-y$). Alternatively, every state quantity x of the plant 4 may be measured to input a state deviation ex between the state variable $x_M$ of the mathematical model 14 and the state quantity x of the plant 4 ($ex=x_M-x$) to the feedback controller 22. The same effects are obtained also when the state deviation $ex=x_M-x$ is input to the feedback controller 22 to build from the feedback controller 22 a state feedback control system of a fixed gain, or a piecewise affine control system that uses multi-parametric planning.

The past model input which is the model input of one step prior in the description given above does not need to be that of one step prior. For example, the past model input can be a model input of a plurality of steps prior and still can easily provide the same effects. In short, the same effects as those of the first embodiment are obtained when other past model inputs than the model input of one step prior is used as the past model input.

Configured as described above, the first embodiment can provide a servo controller capable of controlling a plant so that the plant follows quickly and precisely by automatically changing the characteristics of a controller to suit diversely changing operation commands with a small amount of calculation, without giving discontinuous values to motor torque or other forms of input to the plant 4, while limiting the absolute value and rate of change of input to the plant 4.

Second Embodiment

Figure 4:
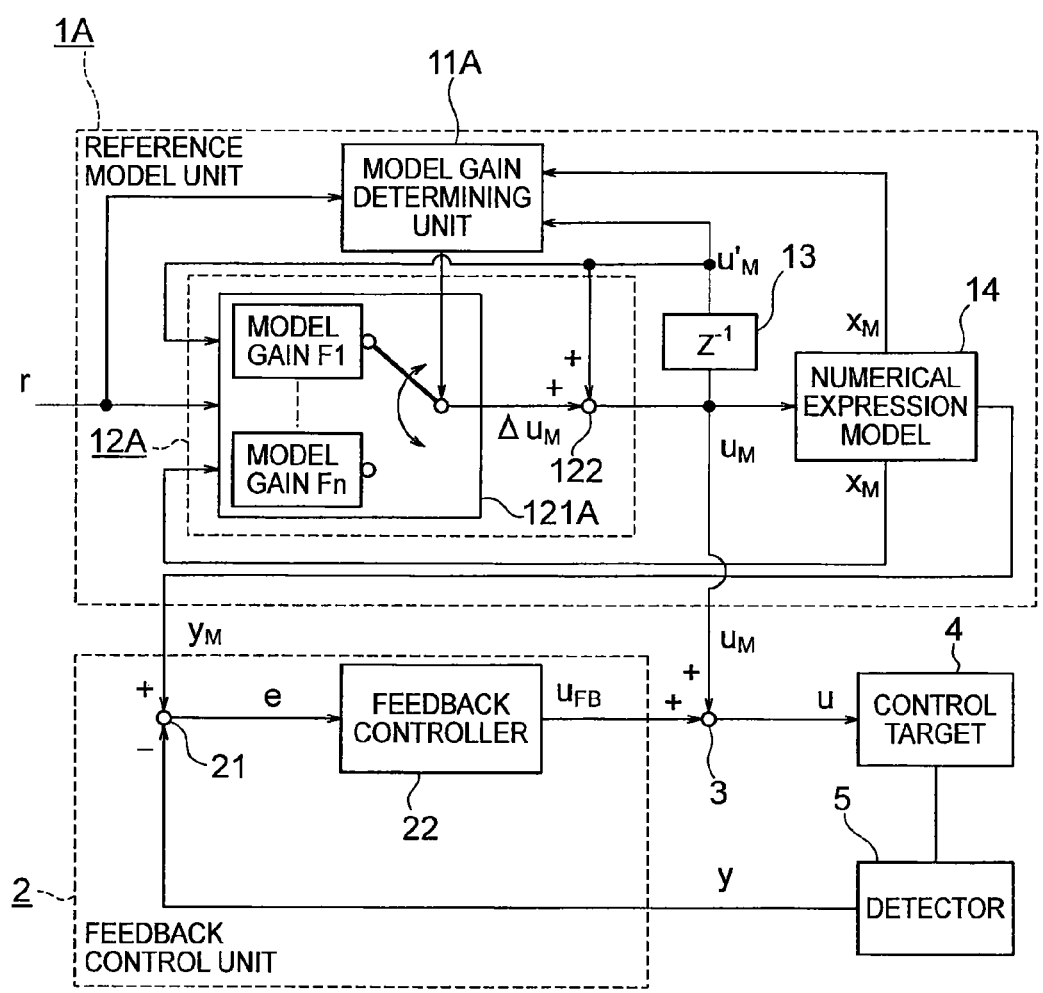
FIG. 4 A block diagram illustrating the configuration of a servo controller according to a second embodiment of the present invention.

A servo controller according to a second embodiment of the present invention is described with reference to FIGS. 4 to 6. FIG. 4 is a block diagram illustrating the configuration of the servo controller according to the second embodiment of the present invention. In the second embodiment, too, a case of using the model input of one step prior as the past model input is described and the same symbols are used. A model controller determining unit is referred to as model gain determining unit in this embodiment because this embodiment, too, changes the model gain of a model controller to switch the characteristics of the model controller.

As illustrated in FIG. 4, the servo controller according to the second embodiment inputs the reference r for the control output y which indicates the position and speed of the machine to be driven and the control output y of the plant 4 which indicates the position and speed of the motor detected by the detector 5, and outputs the control input u to the plant 4 so that the control output y follows to the reference r.

The servo controller according to the second embodiment includes a reference model unit 1A, the feedback control unit 2, and the adder 3, and is connected to the plant 4, which is composed of a mechanical load and a driving actuator such as a motor, and to the detector 5 which is an encoder or the like.

The reference model unit 1A inputs the reference r, outputs the model output $y_M$ of the mathematical model 14 which indicates an ideal operation of the plant 4 to the feedback control unit 2, and outputs the model input $u_M$ to the adder 3. A description of the feedback control unit 2, the adder 3, the plant 4, and the detector 5 which have the same configurations as in the first embodiment described above is omitted here. The only difference between the second embodiment and the first embodiment described above is the reference model unit 1A, and the operation of the reference model unit 1A alone is therefore described.

The reference model unit 1A includes a model gain determining unit 11A for determining a model gain of a model controller, which is described later, a model controller 12A for controlling the model output $y_M$ so that the model output $y_M$ follows to a reference r, the model input memory 13 for storing the model input $u_M$, and the mathematical model 14 simulating the characteristics of the plant 4. The model input memory 13 and the mathematical model 14 operate the same way as in the first embodiment, and a description thereof is omitted.

The operation of the model controller 12A is described next. The model controller 12A includes a sub-model controller 121A and the adder 122. The sub-model controller 121A inputs the reference r, the model input $u_M'$ of one step prior which is output from the model input memory 13, and the state variable $x_M$ of the mathematical model 14. Based on the multiplication of those values by a model gain that is output from the model gain determining unit 11A, the sub-model controller 121A calculates the model input change rate $\Delta u_M$ so that the model output $y_M$ of the mathematical model 14 equals to the reference r, and outputs the model input change rate $\Delta u_M$ to the adder 122. A model gain is a vector including n+1 numerical values, and is designed in advance by pole assignment, loop shaping, or a similar method. The model gain used in the sub-model controller 121A is selected online by the model gain determining unit 11A described later. The model controller 12A is therefore a switching type controller.

The operation of the model gain determining unit 11A is described next. The model gain determining unit 11A selects one of a plurality of model gains designed in advance so that the absolute values of the model input $u_M$ and the model input change rate $\Delta u_M$ do not exceed given limits. Determining a plurality of model gains in advance reduces the amount of online calculation and shortens the sampling time.

How a model gain is selected is described next. A maximal output admissible set $O_\infty$ is used to select a model gain. The maximal output admissible set $O_\infty$ is a condition for keeping the control system (closed loop system) from violating constraints. A method of calculating the maximal output admissible set $O_\infty$ is described in Hirata, Fujita, "Analysis of Conditions for Non-violation of Constraints on Linear Discrete-Time Systems with Exogenous Inputs", The Institute of Electrical Engineers of Japan, C, 118-3, 384/390, 1998. Constraints in the second embodiment are the model input limitation and model input change rate limitation expressed by Expression (8). The maximal output admissible set $O_\infty$ is described first.

In the second embodiment, too, the model input $u_M'$ of one step prior is fed back to the sub-model controller 121A, and the adder 122 adds the model input change rate $\Delta u_M$ and the model input $u_M'$ of one step prior to generate the model input $u_M$. Accordingly, the discrete-time state equation which combines the model input memory 13, the mathematical model 14, and the adder 122 and which is expressed by the expanded system of Expression (7) is considered.

One of the model gains designed in advance is denoted by Fi. A case of using the model gain Fi is discussed where the sub-model controller 121A uses Expression (15) to calculate the model input change rate $\Delta u_M$ from the state variable $x_M$ of the mathematical model 14 and the model input $u_M'$ of one step prior.

[Math. 14]

$$\Delta uM(k) = Fi \begin{bmatrix} xM(k) \\ uM(k-1) \end{bmatrix} \quad (15)$$

Substituting Expression (15) in Expression (7) produces Expression (16).

[Math. 15]

$$\begin{bmatrix} xM(k+1) \\ uM(k) \end{bmatrix} = \left( \begin{bmatrix} A & B \\ 0 & I \end{bmatrix} + \begin{bmatrix} B \\ I \end{bmatrix} F_i \right) \begin{bmatrix} xM(k) \\ uM(k-1) \end{bmatrix} \quad (16)$$

Expression (16) represents the closed loop system of the reference model unit 1A. Once the state variable $x_M$ of the mathematical model 14 at the k-th step is determined, values of the state variable $x_M$ of the mathematical model 14 and the model input $u_M$ at steps subsequent to the k-th step can be calculated by calculating Expression (16) repeatedly. Because the state variable $x_M$ of the mathematical model 14 and the model input $u_M$ at each step can be calculated, the model input change rate $\Delta u_M$ at each step can also be calculated with the use of Expression (15). Accordingly, once the model gain Fi, the state variable $x_M(k)$ of the mathematical model 14 at the k-th step, and the model input $u_M(k-1)$ at the (k-1)-th step are determined, whether or not the model input and the model input change rate are within the model input limitation and model input change rate limitation of Expression (8) can be calculated in advance.

This means that the opposite is possible, and conditions of the state variable $x_M$ of the mathematical model 14 and the model input $u_M$ that do not violate limitation conditions can be calculated when the limitation conditions of Expression (8) and the model gain Fi are given. As described above, the conditions that do not violate limitation conditions are called a maximal output admissible set.

Figure 5:
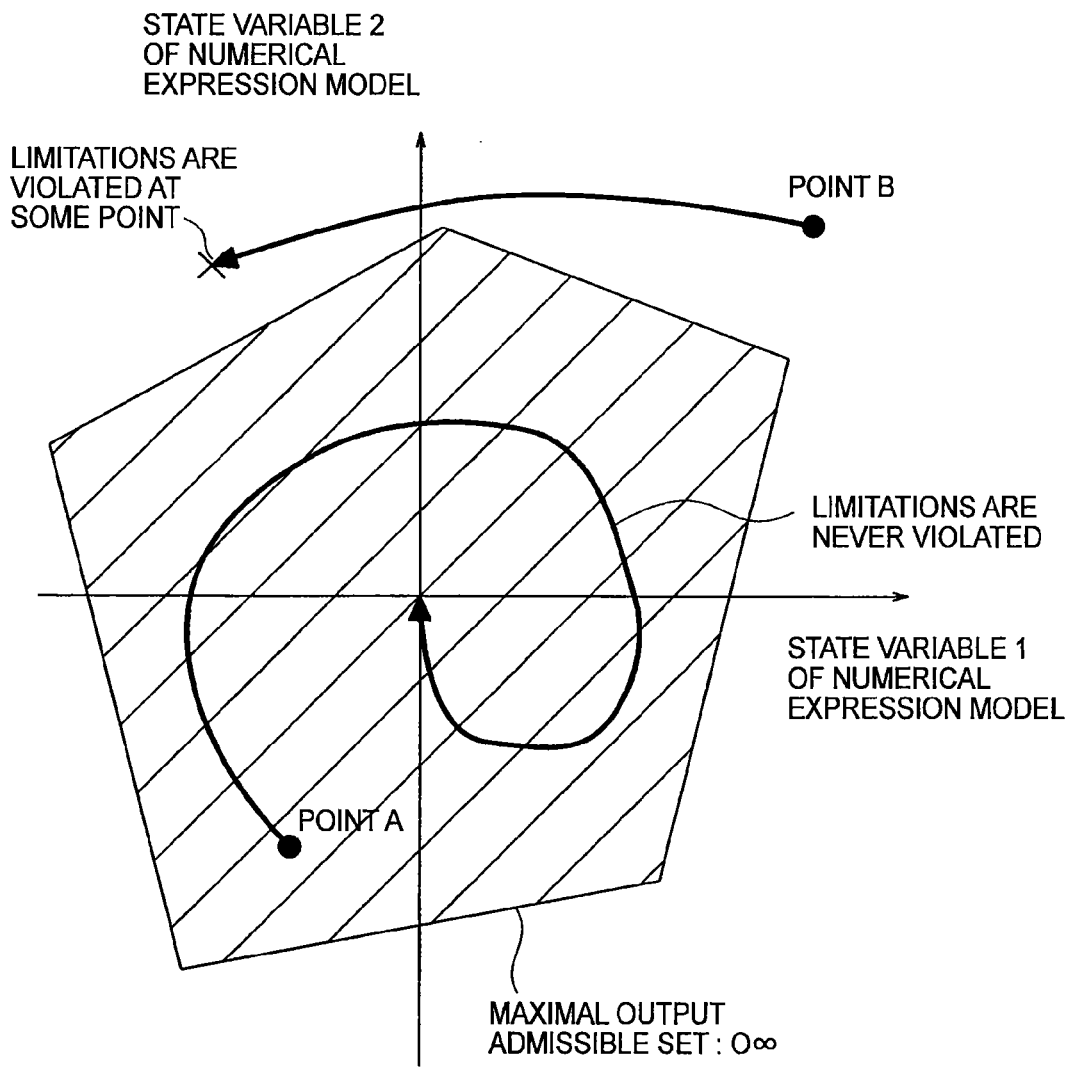
FIG. 5 A diagram illustrating an example of a maximal output admissible set of the servo controller according to the second embodiment of the present invention.

FIG. 5 is a diagram illustrating an example of the maximal output admissible set of the servo controller according to the second embodiment of the present invention.

In FIG. 5, the axis of abscissa represents a first element of the state variable $x_M$ of the mathematical model 14 and the axis of ordinate represents a second element of the state variable $x_M$. The inside of the polygon represents the maximal output admissible set $O_\infty$. A point A represents a state in which the state variable $x_M$ of the mathematical model 14 at the k-th step is inside the maximal output admissible set $O_\infty$. A point B represents a state in which the state variable $x_M$ at the k-th step is outside the maximal output admissible set $O_\infty$. Lines leading out of the respective points represent the trajectories of the state variable $x_M$ at steps subsequent to the k-th step. When the state variable $x_M$ at the k-th step is at the point A or other points inside the maximal output admissible set $O_\infty$, the model input limitation $|u_M| \leq uM_{max}$ and the model input change rate limitation $|\Delta u_M| \leq \Delta uM_{max}$ are not violated at steps subsequent to the k-th step as well. On the other hand, when the state variable $x_M$ at the k-th step is at the point B or other points outside the maximal output admissible set $O_\infty$, even if the model input and the model input change rate are within the model input limitation $|u_M| \leq uM_{max}$ and the model input change rate limitation $|\Delta u_M| \leq \Delta uM_{max}$ at the k-th step, the model input limitation $|u_M| \leq uM_{max}$ and the model input change rate limitation $|\Delta u_M| \leq \Delta uM_{max}$ are violated without fail at some point in time subsequent to the k-th step. In the example described above, the state variable $x_M$ of the mathematical model 14 alone is used for the determination about the inside/outside of the maximal output admissible set, but it should be understood that the model input $u_M$ and the reference r may be used as well.

A model gain selection method that uses the maximal output admissible set is described next. A case where there are three model gains is described with reference to FIG. 6. FIG. 6 is a diagram illustrating an operation example of the servo controller according to the second embodiment of the present invention. It should be understood that the second embodiment is not limited to the case where there are three model gains. The second embodiment is also not limited to the case where the state variable $x_M$ of the mathematical model 14 is a numerical vector including two numerical values.

Figure 6:
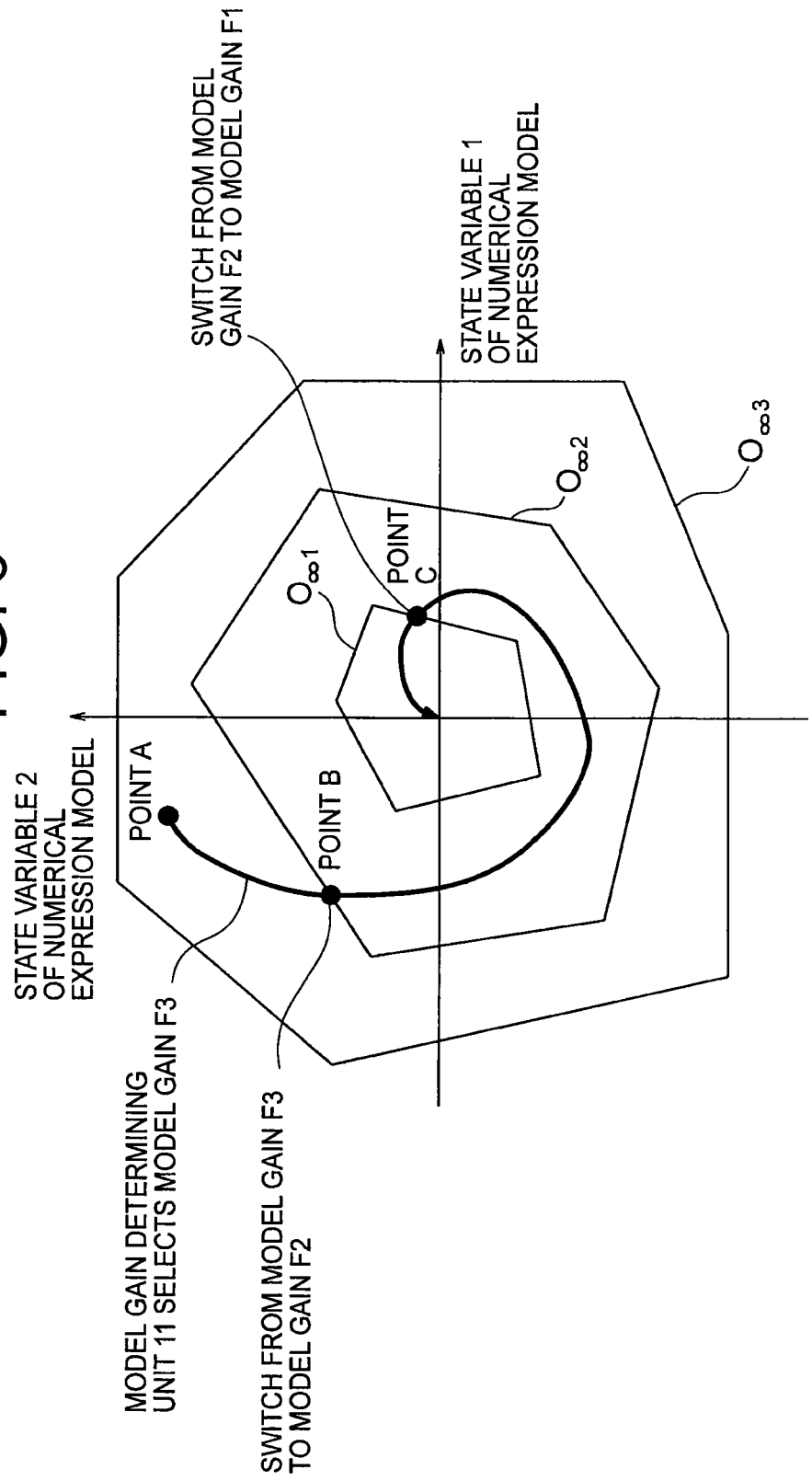
FIG. 6 A diagram illustrating an operation example of the servo controller according to the second embodiment of the present invention.

FIG. 6 illustrates a situation where model gains F1, F2, and F3 are designed in advance and maximal output admissible sets $O_{\infty 1}$, $O_{\infty 2}$, and $O_{\infty 3}$ are calculated for the cases of using the model gains F1, F2, and F3, respectively. In FIG. 6, the axis of abscissa represents the first element of the state variable $x_M$ of the mathematical model 14 and the axis of ordinate represents the second element of the state variable $x_M$. The polygons respectively indicate the border lines of the maximal output admissible sets $O_{\infty 1}$, $O_{\infty 2}$, and $O_{\infty 3}$. In the second embodiment, the model gain of the highest response is F1, the model gain of the lowest response is F3. The model gain F2 has performance that is at a level between performance levels of the model gains F1 and F3. The maximal output admissible set $O_\infty$ is dependent on the model gain Fi. Therefore, the maximal output admissible sets $O_{\infty 1}$, $O_{\infty 2}$, and $O_{\infty 3}$ which are respectively for the cases where the model gains F1, F2, and F3 are used differ from one another.

For example, assume that the state variable $x_M$ of the mathematical model 14 is at a point A. The point A is inside the maximal output admissible set $O_{\infty 3}$ and outside the maximal output admissible sets $O_{\infty 1}$ and $O_{\infty 2}$. Accordingly, the limitations of Expression (8) are not violated when the model gain F3 is used but are violated at some point in time when the model gain F1 or F2 is used. The model gain determining unit 11A therefore selects the model gain F3 with which the limitations of Expression (8) are not violated. The model gain determining unit 11A outputs the selected model gain F3 to the model controller 12A.

The state variable $x_M$ of the mathematical model 14 next moves to a point B. The point B is inside the maximal output admissible sets $O_{\infty 2}$ and $O_{\infty 3}$ and is outside the maximal output admissible set $O_{\infty 1}$. Accordingly, the limitations of Expression (8) are not violated when the model gain F2 or F3 is used, and one of the limitations of Expression (8) is violated at some point in time when the model gain F1 is used. When there are a plurality of model gains that do not violate the limitation of Expression (8) as in this case, the model gain determining unit 11A selects the model gain of the highest response of the plurality of model gains. In this example, the model gain determining unit 11A selects the model gain F2, which is higher in response than the model gain F3, and outputs the model gain F2 to the model controller 12A.

Thereafter, the state variable $x_M$ of the mathematical model 14 moves to a point C. The point C is inside the maximal output admissible sets $O_{\infty 1}$, $O_{\infty 2}$, and $O_{\infty 3}$. Accordingly, the limitations of Expression (8) are not violated when any of the model gains F1, F2, and F3 is used. The model gain determining unit 11A therefore selects the model gain F1 which has the highest response, and outputs the model gain F1 to the model controller 12A.

To summarize the operation described above, the model gain determining unit 11A performs the following three operations.

1. For each model gain Fn (n=1, . . . , R) designed in advance, the maximal output admissible set $O_{\infty n}$ (n=1, . . . , R) is calculated in advance. The symbol R represents the number of model gains Fn designed.

2. The reference r, the state variable $x_M$ of the mathematical model 14, and the model input $u_M'$ of one step prior are obtained to determine, for each model gain Fn, whether the current value is inside or outside the maximal output admissible set $O_{\infty n}$ that is created with the use of the model gain Fn. In other words, the model gain determining unit 11A determines, for each model gain Fn, whether or not the limitations are violated when the model gain Fn is used.

3. The model gain Fn that does not violate the limitations is selected and output to the model controller 12A. If there are a plurality of model gains Fn that do not violate the limitations, the model gain Fn that has the highest response of the plurality of model gains is selected.

The sub-model controller 121A uses the model gain Fn output from the model gain determining unit 11A and Expression (15) to calculate the model input change rate $\Delta u_M$, and outputs the model input change rate $\Delta u_M$ to the adder 122. The adder 122 adds the model input $u_M'$ of one step prior and the model input change rate $\Delta u_M$ with the use of Expression (16), and outputs the model input $u_M$ to the model input memory 13 and the mathematical model 14. The mathematical model 14 uses the state variable $x_M$ and the model input $u_M$ in Expression (1) to generate the state variable $x_M$ and model output $y_M$ of the next step. The model input memory 13 stores the model input $u_M$ for the duration of one step.

By repeating the above-mentioned operations, the reference model unit 1A keeps generating values of the model output $y_M$ and the model input $u_M$.

The description given next is about effects of the second embodiment described above.

The servo controller according to the second embodiment uses the model input $u_M'$ of one step prior to generate the model input $u_M$ and can therefore use the model input change rate $\Delta u_M$ as a new input as in the first embodiment. As a result, a control system that does not allow $\Delta u_M$, namely, the model input change rate $\Delta u_M$ as well as the model input $u_M$ to exceed a given value is realized with ease. In other words, the obtained servo controller exhibits high performance while preventing torque saturation and torque change rate saturation, and voltage saturation which is closely related to the rate of change of torque. The obtained servo controller is also capable of preventing a rapid change in model input $u_M$ when the model gain is switched.

In the second embodiment, too, the calculation of the model input involves only selecting a model gain and multiplying the state variable of the mathematical model 14 by the model gain. This shortens the calculation time and thus cuts short the sampling time as well.

As in the first embodiment, a deviation between the reference r and the state variable $x_M$ can be used to perform control equivalent to Expression (15) for enabling a plant to follow to the reference r. A gain of the reference r in this case can be calculated automatically from Fi. The maximal output admissible set $O_{\infty 0}$ can also be calculated automatically.

The second embodiment uses, as in the first embodiment, the model input of one step prior as the past model input. However, the past model input does not need to be that of one step prior. For example, the past model input can be a model input of a plurality of steps prior and still can easily provide the same effects. In short, the same effects as those of the second embodiment are obtained when other past model inputs than the model input of one step prior is used as the past model input.

Third Embodiment

Figure 7:
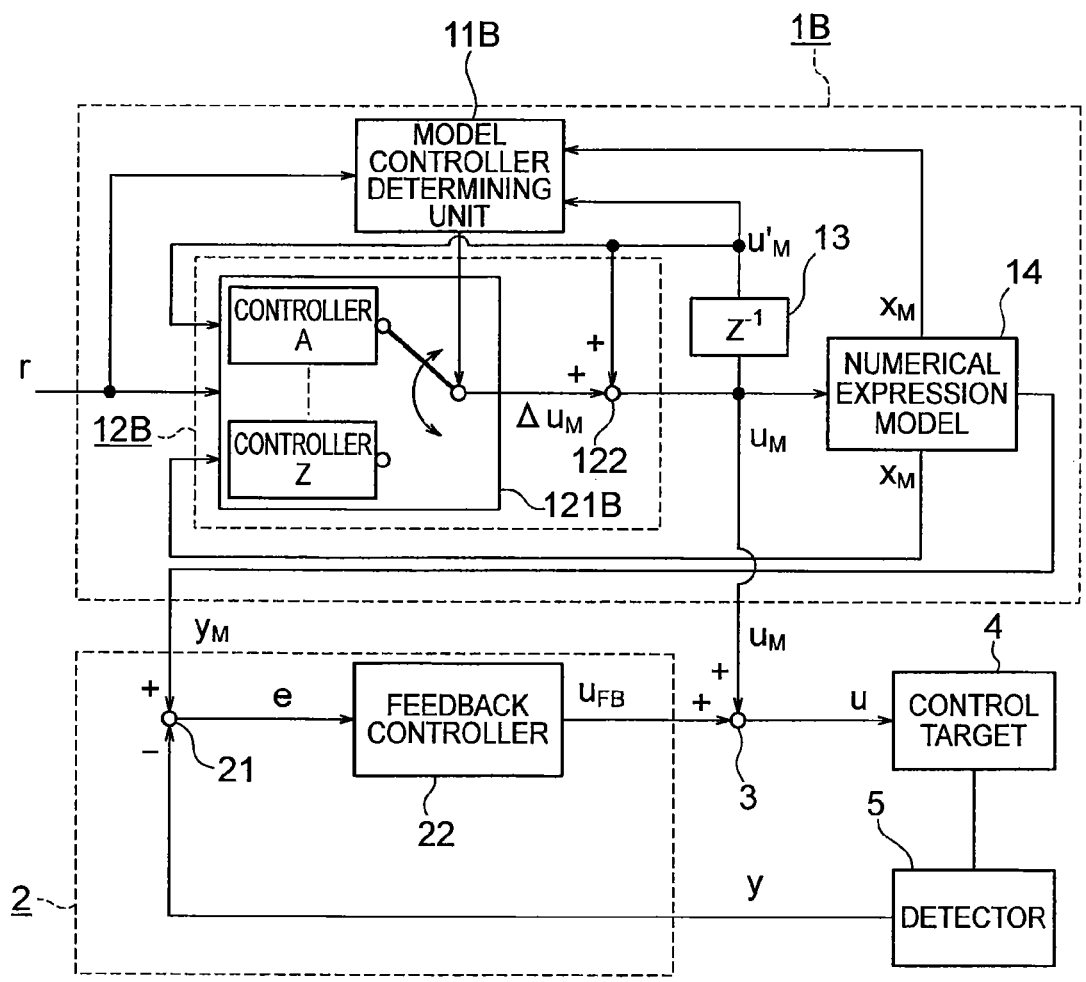
FIG. 7 A block diagram illustrating the configuration of a servo controller according to a third embodiment of the present invention.

A servo controller according to a third embodiment of the present invention is described with reference to FIGS. 7 to 10. FIG. 7 is a block diagram illustrating the configuration of the servo controller according to the third embodiment of the present invention. In the third embodiment, too, a case of using the model input of one step prior as the past model input is described and the same symbols are used. The third embodiment uses the maximal output admissible set $O_\infty$ to switch a controller as in the second embodiment. The difference between the third embodiment and the second embodiment is that, while only the model gain Fn is switched in the second embodiment, the configuration of the model controller itself is switched in the third embodiment.

As illustrated in FIG. 7, the servo controller according to the third embodiment inputs a reference r for a control output y which indicates the position and speed of a machine to be driven and the control output y of the plant 4 which indicates the position and speed of a motor detected by the detector 5, and outputs a control input u to the plant 4 so that the control output y follows to the reference r.

The servo controller according to the third embodiment includes a reference model unit 1B, the feedback control unit 2, and the adder 3, and is connected to the plant 4, which is composed of the mechanical load and the driving actuator such as the motor, and to the detector 5 which is the encoder or the like.

The reference model unit 1B inputs the reference r, outputs the model output $y_M$ of the mathematical model 14 which indicates an ideal operation of the plant 4 to the feedback control unit 2, and outputs the model input $u_M$ to the adder 3. A description of the feedback control unit 2, the adder 3, the plant 4, and the detector 5 which have the same configurations as in the first and second embodiments described above is omitted here. The only difference between the third embodiment and the first and second embodiments described above is the reference model unit 1B, and the operation of the reference model unit 1B alone is therefore described.

The reference model unit 1B includes a model controller determining unit 11B which selects from controllers A to Z inside a model controller described later, a model controller 12B which causes the model output $y_M$ to follow to the reference r, the model input memory 13 which stores the model input $u_M$, and the mathematical model 14 which simulates the characteristics of the plant 4. The model input memory 13 and the mathematical model 14 operate the same way as in the first embodiment and the second embodiment, and a description thereof is omitted.

The operation of the model controller 12B is described next. The model controller 12B includes a sub-model controller 121B and the adder 122. The sub-model controller 121B inputs the reference r, the model input $u_M'$ of one step prior which is output from the model input memory 13, and the state variable $x_M$ of the mathematical model 14. Using those values and one of the controllers A to Z that is selected by the model controller determining unit 11B so that the model input and the model input change rate are within the limitations, the sub-model controller 121B calculates the model input change rate $\Delta u_M$ so that the model output $y_M$ of the mathematical model 14 equals to the reference r, and outputs the model input change rate $\Delta u_M$ to the adder 122. The controllers A to Z are designed in advance by PID control, H ∞ control, or the like. Which of the controllers A to Z is used in the sub-model controller 121B is selected online by the model controller determining unit 11b described later.

Figure 8:
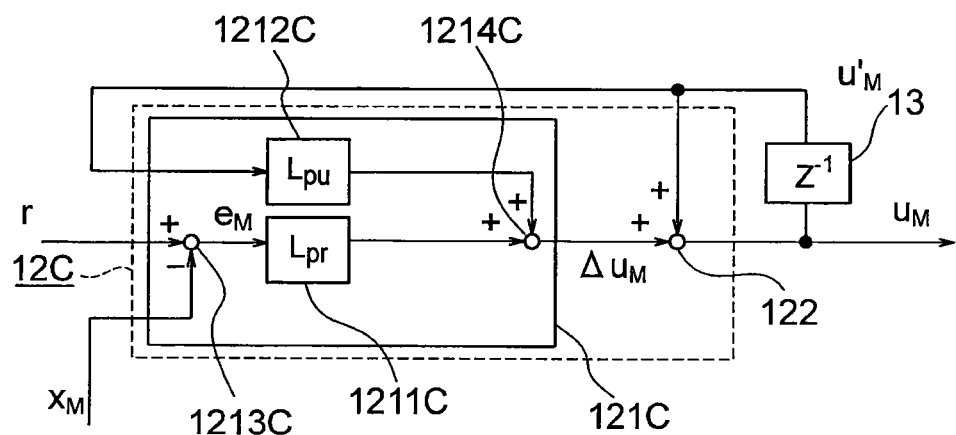
FIG. 8 A block diagram illustrating an example of a model controller of the servo controller according to the third embodiment of the present invention.
Figure 9:
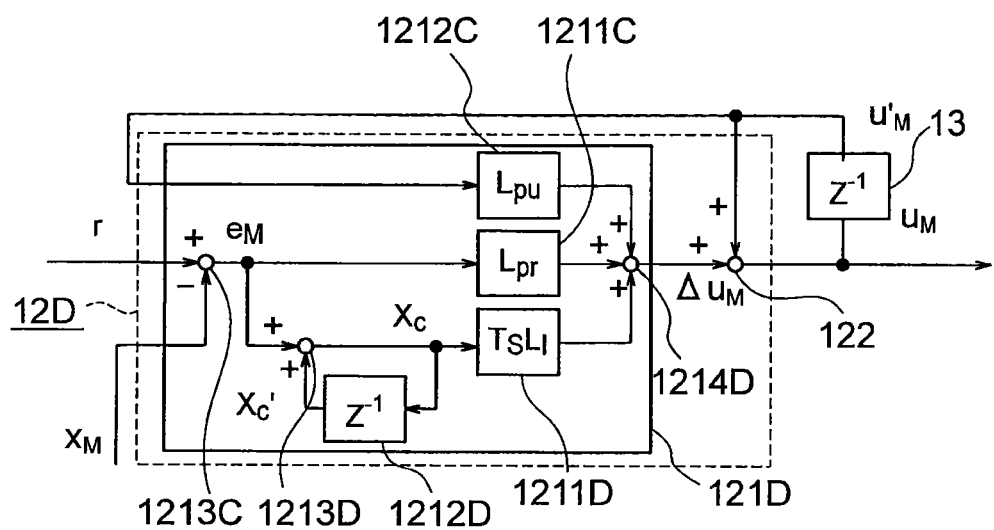
FIG. 9 A block diagram illustrating another example of the model controller of the servo controller according to the third embodiment of the present invention.
Figure 10:
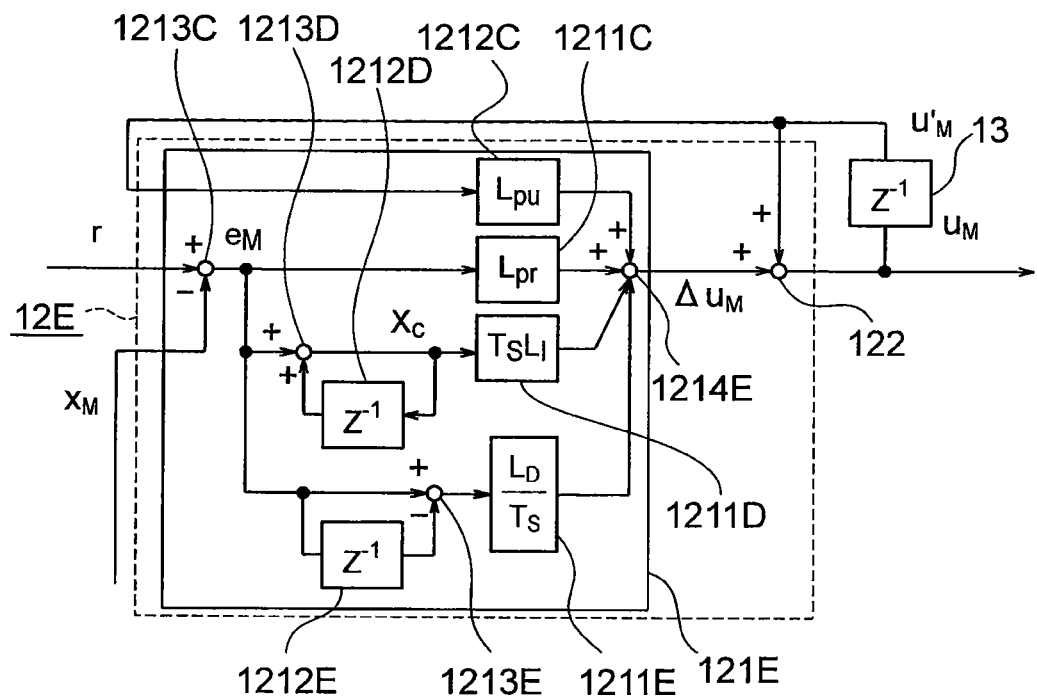
FIG. 10 A block diagram illustrating still another example of the model controller of the servo controller according to the third embodiment of the present invention.

The following description of the third embodiment deals with, for simplification, a case where the expanded system of the mathematical model which combines the mathematical model 14 with the adder 122 and the model input memory 13 is expressed by the discrete-time state equation of Expression (7), and three sub-model controllers 121C, 121D, and 121E, which are illustrated in FIGS. 8 to 10, respectively, are designed in advance. However, the third embodiment is not limited to using the sub-model controllers 121C, 121D, and 121E.

The sub-model controller 121C of FIG. 8 inputs the reference r, the state variable $x_M$, and the model input $u_M'$ of one step prior, and outputs the model input change rate $\Delta u_M$ to the adder 122. The sub-model controller 121C includes a subtracter 1213C, a model deviation gain multiplication unit 1211C, a one-step prior model input gain multiplication unit 1212C, and an adder 1214C. The subtracter 1213C inputs the reference r and the state variable $x_M$, calculates a model deviation $e_M$ which is the difference between those values, and outputs the model deviation $e_M$. The model deviation gain multiplication unit 1211C calculates the product of the model deviation $e_M$ which is output from the subtracter 1213C and a given model deviation gain $L_{pr}$, and outputs the product to the adder 1214C. The one-step prior model input gain multiplication unit 1212C calculates the product of the model input $u_M'$ of one step prior and a one-step prior model input gain $L_{pu}$, and outputs the calculation result to the adder 1214C. The adder 1214C adds the output of the model deviation gain multiplication unit 1211C and the output of the one-step prior model input multiplication unit 12120 to calculate the model input change rate $\Delta u_M$.

The sub-model controller 121D of FIG. 9 also inputs the reference r, the state variable $x_M$, and the model input $u_M'$ of one step prior, and outputs the model input change rate $\Delta u_M$ to the adder 122. The difference from the sub-model controller 121C of FIG. 8 is that an integration operation is added by using an integration value memory 1212D to store an integration value $x_c$ and adding the stored integration value to the model deviation $e_M$. The sub-model controller 121D uses the model deviation gain multiplication unit 1211C, the one-step prior model input gain multiplication unit 1212C, and the subtracter 1213C which are used in the sub-model controller 121C as well. A description of those components is therefore omitted. The sub-model controller 121D includes, in addition to those components, an adder 1213D, a model deviation integration gain multiplication unit 1211D, the integration value memory 1212D, and an adder 1214D. The adder 1213D adds the model deviation $e_M$ and a one-step prior integration value $x_c'$, and outputs the sum as the integration value $x_C$ to the model deviation integration gain multiplication unit 1211D. The model deviation integration gain multiplication unit 1211D multiplies the integration value $x_c$ by a model deviation integration gain $L_I$ and a one-sampling time $T_S$, and outputs the product of those values to the adder 1214D. The integration value memory 1212D inputs the integration value $x_C$ to store for the duration of one sampling time, and outputs to the adder 1213D a value that is stored at the completion of one sampling time as a one-step prior integration value $x_C'$. The adder 1214D adds all values that are output from the model deviation gain multiplication unit 1211C, the one-step prior model input gain multiplication unit 1212C, and the model deviation integration gain multiplication unit 1211D, and outputs the sum to the adder 122 as the model input change rate $\Delta u_M$.

The sub-model controller 121E of FIG. 10 also inputs the reference r, the state variable $x_M$, and the model input $u_M'$ of one step prior, and outputs the model input change rate $\Delta u_M$ to the adder 122. The difference from the sub-model controller 121C of FIG. 8 and the sub-model controller 121D of FIG. 9 is that a differentiation operation is added to the sub-model controller 121E by using a state variable memory 1212E. The sub-model controller 121E uses the model deviation gain multiplication unit 1211C, the one-step prior model input gain multiplication unit 1212C, and the subtracter 1213C, which are also used in the sub-model controller 121C, and uses the model deviation integration gain multiplication unit 1211D, the integration value memory 1212D and the adder 1213D, which are also used in the model controller 121D. A description of those components is omitted. The sub-model controller 121E includes, in addition to those components, the state variable memory 1212E, a subtracter 1213E, a state variable differentiation gain multiplication unit 1211E, and an adder 1214E. The state variable memory 1212E stores the state variable $x_M$ for the duration of one sampling time and, at the completion of one sampling time, outputs the stored value to the subtracter 1213E as a one-step prior state variable $x_M'$. The subtracter 1213E subtracts, from the state variable $x_M$, the one-step prior state variable $x_M'$ which is output from the state variable memory 1212E, and outputs the difference to the state variable differentiation gain multiplication unit 1211E. The state variable differentiation gain multiplication unit 1211E divides the difference output from the subtracter 1213E by the one sampling time $T_S$, multiplies the quotient by a state variable differentiation gain $L_D$, and outputs the calculation result to the adder 1214E. The adder 1214E adds all values output from the model deviation gain multiplication unit 1211C, the one-step prior model input gain multiplication unit 1212C, the model deviation integration gain multiplication unit 1211D, and the variable state differentiation gain multiplication unit 1211E, and outputs the sum to the adder 122 as the model input change rate $\Delta u_M$.

In the third embodiment, unlike the second embodiment, an integration operation is added to the sub-model controller 121D by using the integration value memory 1212D, and a differentiation operation is added to the sub-model controller 121E by using the state variable memory 1212E. The third embodiment is thus configured so as to switch not only the gain but also the operation of the controller. The notation in the third embodiment is simplified by using the same symbols for the model deviation gain $L_{pr}$ and the one-step prior model input gain $L_{pu}$ in the sub-model controllers 121C, 121D, and 121E. Numerical values of those gains may vary among the sub-model controllers 121C, 121D, and 121E. The model deviation integration gain $L_I$ also uses the same symbol in the sub-model controllers 121D and 121E. Numerical values of those gains, too, may vary between the sub-model controllers 121D and 121E.

The operation of the model controller determining unit 11B is described next. The model controller determining unit 11B selects one controller out of the plurality of controllers A to Z designed in advance that prevents the absolute values of the model input $u_M$ and the model input change rate $\Delta u_M$ from exceeding given limits. By defining the plurality of controllers A to Z in advance, the amount of online calculation is reduced and the sampling time is shortened as well.

In the third embodiment, the model controller determining unit 11B uses the maximal output admissible set $O_\infty$ to switch among the controllers A to Z as in the second embodiment. To calculate the maximal output admissible set $O_\infty$, a closed loop system of the reference model unit 1B needs to be calculated as in Expression (16) of the second embodiment.

First, a closed loop system for the case where the model controller 12C of FIG. 8 is used is calculated. The model input change rate $\Delta u_M$ is calculated by the following Expression (17), when the sub-model controller 121C of FIG. 8 is used.

[Math. 16]

$$\Delta uM(k) = [L_{pr} \; L_{pu}] \begin{bmatrix} r(k) - xM(k) \\ uM(k-1) \end{bmatrix} \quad (17)$$

By substituting Expression (17) in Expression (7), the closed loop system for the case where the model controller 12C is used is therefore expressed by the following Expression (18).

[Math. 17]

$$\begin{bmatrix} xM(k+1) \\ uM(k) \end{bmatrix} = \begin{bmatrix} A - BL_{pr} & B + BL_{pu} \\ -L_{pr} & I + L_{pu} \end{bmatrix} \begin{bmatrix} xM(k) \\ uM(k-1) \end{bmatrix} + \begin{bmatrix} BL_{pr} \\ L_{pr} \end{bmatrix} r(k) \quad (18)$$

Similarly, closed loop systems are calculated for the cases where the model controller 12D of FIG. 9 and the model controller 12E of FIG. 10 are used. In the case where the model controller 12D of FIG. 9 is used, the model input change rate $\Delta u_M$ that is output from the sub-model controller 121D is calculated by the following Expressions (19) and (20).

[Math. 18]

$$\Delta uM(k) = [L_{pr} \; L_{pu} \; Ts \cdot L_I] \begin{bmatrix} r(k) - xM(k) \\ uM(k-1) \\ xc(k) \end{bmatrix} \quad (19)$$

$$xc(k+1) = xc(k) + r(k) - xM(k) \quad (20)$$

By substituting Expressions (19) and (20) in Expression (7), the closed loop system for the case where the model controller 12D is used is therefore expressed by the following Expression (21).

[Math. 19]

$$\begin{bmatrix} xM(k+1) \\ uM(k) \\ xc(k+1) \end{bmatrix} = \quad (21)$$

$$\begin{bmatrix} A - BL_{pr} & B + BL_{pu} & BTs \cdot Ki \\ -L_{pr} & I + L_{pu} & Ts \cdot Ki \\ -I & 0 & I \end{bmatrix} \begin{bmatrix} xM(k) \\ uM(k-1) \\ xc(k) \end{bmatrix} + \begin{bmatrix} BL_{pr} \\ L_{pr} \\ I \end{bmatrix} r(k)$$

When the model controller 12E of FIG. 10 is used, the model input change rate $\Delta u_M$ that is output from the sub-model controller 121E is calculated by the following Expression (20).

[Math. 20]

$$\Delta uM(k) = [L_{pr} \; L_{pu} \; Ts \cdot L_I] \begin{bmatrix} r(k) - xM(k) \\ uM(k-1) \\ xc(k) \end{bmatrix} - \frac{L_D}{Ts}(x(k) - x(k-1)) \quad (22)$$

By substituting Expressions (20) and (22) in Expression (7), the closed loop system for the case where the model controller 12E is used is therefore expressed by the following Expression (23).

[Math. 21]

$$\begin{bmatrix} xM(k+1) \\ uM(k) \\ xc(k+1) \\ xM(k) \end{bmatrix} = \begin{bmatrix} A - BL_{pr} & B + BL_{pu} & BTs \cdot Ki & \frac{L_D}{Ts}B \\ -L_{pr} & I + L_{pu} & Ts \cdot Ki & \frac{L_D}{Ts} \\ -I & 0 & I & 0 \\ I & 0 & 0 & 0 \end{bmatrix} \quad (23)$$

$$\begin{bmatrix} xM(k) \\ uM(k-1) \\ xc(k) \\ xM(k-1) \end{bmatrix} + \begin{bmatrix} BL_{pr} \\ L_{pr} \\ I \\ 0 \end{bmatrix} r(k)$$

Similarly to Expression (23) which is the closed loop system for the case where the model control unit 12E is used, Expression (18) which is the closed loop system for the case where the model controller 12C is used and Expression (21) which is the closed loop system for the case where the model controller 12D is used can respectively be expressed, as closed loop systems that use the state variable $x_M(k)$, the one-step prior model input $u_M(k-1)$, the integration value $x_C(k)$, and the one-step prior state variable $_xM(k-1)$, by the following Expressions (24) and (25).

[Math. 22]

$$\begin{bmatrix} xM(k+1) \\ uM(k) \\ xc(k+1) \\ xM(k) \end{bmatrix} = \quad (24)$$

$$\begin{bmatrix} A - BL_{pr} & B + BL_{pu} & 0 & 0 \\ -L_{pr} & I + L_{pu} & 0 & 0 \\ 0 & 0 & I & 0 \\ I & 0 & 0 & 0 \end{bmatrix} \begin{bmatrix} xM(k) \\ uM(k-1) \\ xc(k) \\ xM(k-1) \end{bmatrix} + \begin{bmatrix} BL_{pr} \\ L_{pr} \\ 0 \\ 0 \end{bmatrix} r(k)$$

-continued $$\begin{bmatrix} xM(k+1) \\ uM(k) \\ xc(k+1) \\ xM(k) \end{bmatrix} = \begin{bmatrix} A-BL_{pr} & B+BL_{pu} & BTs \cdot Ki & 0 \\ -L_{pr} & I+L_{pu} & Ts \cdot Ki & 0 \\ -I & 0 & I & 0 \\ I & 0 & 0 & 0 \end{bmatrix} \begin{bmatrix} xM(k) \\ uM(k-1) \\ xc(k) \\ xM(k-1) \end{bmatrix} + \begin{bmatrix} BL_{pr} \\ L_{pr} \\ I \\ 0 \end{bmatrix} r(k) \quad (25)$$

The description given below is simplified by substituting those expressions with the following Expressions (26), (27), (28), and (29).

[Math. 23]

$$x_{close} = \begin{bmatrix} xM(k+1) \\ uM(k) \\ xc(k+1) \\ xM(k) \end{bmatrix} \quad (26)$$

$$Ac1 = \begin{bmatrix} A-BL_{pr} & B+BL_{pu} & 0 & 0 \\ -L_{pr} & I+L_{pu} & 0 & 0 \\ 0 & 0 & I & 0 \\ I & 0 & 0 & 0 \end{bmatrix}, Bc1 = \begin{bmatrix} BL_{pr} \\ L_{pr} \\ 0 \\ 0 \end{bmatrix} \quad (27)$$

$$Ac2 = \begin{bmatrix} A-BL_{pr} & B+BL_{pu} & BTs \cdot Ki & 0 \\ -L_{pr} & I+L_{pu} & Ts \cdot Ki & 0 \\ -I & 0 & I & 0 \\ I & 0 & 0 & 0 \end{bmatrix}, Bc2 = \begin{bmatrix} BL_{pr} \\ L_{pr} \\ I \\ 0 \end{bmatrix} \quad (28)$$

$$Ac3 = \begin{bmatrix} A-BL_{pr} & B+BL_{pu} & BTs \cdot Ki & \frac{L_D}{Ts}B \\ -L_{pr} & I+L_{pu} & Ts \cdot Ki & \frac{L_D}{Ts} \\ -I & 0 & I & 0 \\ I & 0 & 0 & 0 \end{bmatrix} \quad (29)$$

Next, an expression similar to Expression (16) is derived by converting Expressions (23), (24), and (25). Steady-state values $x'_{close1}$, $x'_{close2}$, and $x'_{close3}$ are defined first by the following Expressions (30), (31), and (32).

[Math. 24]

$$x'_{close1}(k) := (I-Ac1)^{-1}Bc1 \cdot r(k) \quad (30)$$

$$x'_{close2}(k) := (I-Ac2)^{-1}Bc2 \cdot r(k) \quad (31)$$

$$x'_{close3}(k) := (I-Ac3)^{-1}Bc2 \cdot r(k) \quad (32)$$

The steady-state values defined by Expressions (30), (31), and (32) are used to define model state deviations $e_{close1}$, $e_{close2}$, and $e_{close3}$ by the following Expressions (33), (34), and (35).

[Math. 25]

$$e_{close1}(k) := x_{close}(k) - x'_{close1}(k) \quad (33)$$

$$e_{close2}(k) := x_{close}(k) - x'_{close2}(k) \quad (34)$$

$$e_{close3}(k) := x_{close}(k) - x'_{close3}(k) \quad (35)$$

The model state deviations $e_{close1}$, $e_{close2}$, and $e_{close3}$ defined by Expressions (33), (34), and (35) are used to convert Expressions (23), (24), and (25) into Expressions (36), (37), and (38), respectively.

[Math. 26]

$$e_{close1}(k+1) = Ac1 \cdot e_{close1}(k) \quad (36)$$

$$e_{close2}(k+1) = Ac2 \cdot e_{close2}(k) \quad (37)$$

$$e_{close3}(k+1) = Ac3 \cdot e_{close3}(k) \quad (38)$$

Expressions (36), (37), and (38) each have the same format as that of Expression (16) and, therefore, the maximal output admissible set $O_\infty$ can be calculated by the same method as in the second embodiment. With the use of the maximal output admissible set $O_\infty$ to select, with the model controller determining unit 11B, from the controllers A to Z, a controller that does not violate the model input limitation $|u_M| \leq uM_{max}$ and the model input change rate limitation $|\Delta u_M| \leq \Delta uM_{max}$ and that has the quickest response, a quick response control system that does not violate the above-mentioned limitations is obtained. The model controller determining unit 11B switches the controllers with the use of the maximal output admissible set $O_\infty$ by the same method as in the second embodiment. A description of the method is therefore omitted.

The servo controller according to the third embodiment uses the model input $u_M'$ of one step prior to generate the model input $u_M$ and the model input change rate $\Delta u_M$ can therefore be used as a new input as in the first embodiment and the second embodiment described above. As a result, a control system that does not allow $\Delta u_M$, namely, the model input change rate $\Delta u_M$, as well as the model input $u_M$ to exceed a given value is realized with ease. In other words, the obtained servo controller exhibits high performance while preventing torque saturation and torque change rate saturation, and voltage saturation which is closely related to the rate of change of torque. The obtained servo controller is also capable of preventing a rapid change in model input $u_M$ when the model gain is switched.

In the third embodiment, too, the calculation of the model input involves only selecting from the controllers A to Z, and calculating the state variable of the mathematical 14 and the controllers A to Z. This shortens the calculation time and thus cuts short the sampling time as well.

The third embodiment uses, as in the first embodiment and the second embodiment, the model input of one step prior as the past model input. However, the past model input does not need to be that of one step prior. For example, the past model input can be a model input of a plurality of steps prior and still can easily provide the same effects. In short, the same effects as those of the second embodiment are obtained when other past model inputs than the model input of one step prior are used as the past model input.

REFERENCE SIGNS LIST 1 reference model unit, 1A reference model unit, 2 feedback control unit, 3 adder, 4 plant, 5 detector, 11 model gain determining unit, 11A model gain determining unit, 11B model controller determining unit, 12 model controller, 12A model controller, 12B model controller, 12C model controller, 12D model controller, 12E model controller, 13 model input memory, 14 mathematical model, 21 subtracter, 22 feedback controller, 121 sub-model controller, 121A sub-model controller, 121B sub-model controller, 121C sub-model controller, 121D sub-model controller, 121E sub-model controller, 122 adder, 1211C model deviation gain multiplication unit, 1212C one-step prior model input gain multiplication unit, 1213C subtracter, 1214C adder, 1211D model deviation integration gain multiplication unit, 1212D: integration value memory, 1213D: adder, 1214D adder, 1211E state variable differentiation gain multiplication unit, 1212E state variable memory, 1213E subtracter, 1214E adder

The invention claimed is:

1. A servo controller, comprising:
   a reference model unit which receives, as an input, a reference to generate a model output and a model input;
   a feedback control unit which receives, as inputs, a control output, which is output from a plant, and the model output to generate a feedback input so that the control output follows the model output; and
   an adder which adds the model input and the feedback input to generate a control input to be input to the plant,
   wherein the reference model unit comprises:
      a mathematical model which simulates characteristics of the plant, and generates the model output and a state variable from the model input;
      a model input memory which receives, as an input, the model input and which outputs, as a past model input, a stored signal of the model input of past;
      a model controller which receives, as inputs, the reference, the state variable, and the past model input to generate the model input; and
      a model controller determining unit which determines the model controller based on the reference, the state variable, and the past model input, and
   wherein the model controller determining unit determines a model gain which is a numerical vector based on the reference, the state variable, and the past model input, and
   wherein the model controller generates the model input based on a value that is obtained by multiplying the reference, the state variable, and the past model input by the model gain.

2. The servo controller according to claim 1, wherein the model controller determining unit selects one out of a plurality of candidates for the model gain defined in advance, and switches to the selected one.

3. The servo controller according to claim 1,
   wherein the model controller comprises a sub-model controller which calculates, as a change rate of the model input, a sum of (1) the value obtained by multiplying the reference, the state variable, and the past model input by the model gain, and (2) a model offset, and outputs the change rate of the model input,
   wherein the model controller outputs a sum of an output of the sub-model controller and the past model input as the model input, and
   wherein the model controller determining unit changes the model offset as well as the model gain.

4. The servo controller according to claim 1, wherein the model controller determining unit determines the model gain so that one of or both of the model input and a change rate of the model input calculated from the model input and the past model input are smaller than a given value.

5. The servo controller according to claim 3, wherein the model controller determining unit determines the model gain and the model offset so that one of or both of the model input and the change rate of the model input are smaller than a given value.

6. The servo controller according to claim 2, wherein the model controller determining unit determines the model gain by using a gain map, which is defined in advance based on the reference, the state variable, and the past model input.

7. The servo controller according to claim 3, wherein the model controller determining unit determines the model gain and the model offset by using a gain map and an offset map, which are defined in advance based on the reference, the state variable, and an output of the model input memory.

8. The servo controller according to claim 7, wherein the model controller determining unit defines the gain map and the offset map in advance so that the following evaluation function is minimized:

$$\min_{\Delta uM(k),\ldots,\Delta uM(k+N-1)} \sum_{i=0}^{N-1} \left( \left\| Q \begin{bmatrix} xM(k+i) \\ uM(k+i-1) \end{bmatrix} \right\|_d + \right.$$

$$\left. \|R\Delta uM(k+i)\|_d \right) + \left\| PN \begin{bmatrix} xM(k+N) \\ uM(k+N-1) \end{bmatrix} \right\|_d \quad [\text{Math. 1}]$$

subject to $xM(k+i) \in X$, $uM(k+i) \in U$, $\Delta uM(k+i-1) \in \Delta U$, $\forall i \in [0, N-1]$ $xM(k+N) \in X_f$, $uM(k+N-1) \in U_f$ provided that $x_M(k)$ represents a state variable of the mathematical model at a k-th step, $u_M(k)$ represents the model input at the k-th step, $\Delta u_M(k)$ represents the change rate of the model input at the k-th step, X represents a state restriction set, U represents a model input restriction set, $\Delta U$ represents a constraint set of the change rate of the model input, $X_f$ represents a terminal constraint set, $U_f$ represents a terminal model input constraint set, Q represents a state weight, R represents an input weight, $P_N$ represents a terminal weight, and N represents a horizon.

9. The servo controller according to claim 1, wherein the mathematical model models a vibratory mechanical system.

10. The servo controller according to claim 2,
    wherein the model controller comprises a sub-model controller which calculates, as a change rate of the model input, a sum of (1) the value obtained by multiplying the reference, the state variable, and the past model input by the model gain, and (2) a model offset, and outputs the change rate of the model input,
    wherein the model controller outputs a sum of an output of the sub-model controller and the past model input as the model input, and
    wherein the model controller determining unit changes the model offset as well as the model gain.

11. The servo controller according to claim 2, wherein the model controller determining unit determines the model gain so that one of or both of the model input and a change rate of the model input calculated from the model input and the past model input are smaller than a given value.

12. The servo controller according to claim 10, wherein the model controller determining unit determines the model gain and the model offset so that one of or both of the model input and the change rate of the model input are smaller than a given value.

13. The servo controller according to claim 4, wherein the model controller determining unit determines the model gain by using a gain map, which is defined in advance based on the reference, the state variable, and the past model input.

14. The servo controller according to claim 5, wherein the model controller determining unit determines the model gain and the model offset by using a gain map and an offset map, which are defined in advance based on the reference, the state variable, and an output of the model input memory.

15. The servo controller according to claim 14, wherein the model controller determining unit defines the gain map and the offset map in advance so that the following evaluation function is minimized:

[Math. 1]
$$\min_{\Delta uM(k),\cdots,\Delta uM(k+N-1)} \sum_{i=0}^{N-1} \left( \left\| Q \begin{bmatrix} xM(k+i) \\ uM(k+i-1) \end{bmatrix} \right\|_d + \|R\Delta uM(k+i)\|_d \right) + \left\| P_N \begin{bmatrix} xM(k+N) \\ uM(k+N-1) \end{bmatrix} \right\|_d$$

subject to $xM(k+i) \in X$, $uM(k+i) \in U$,
$\Delta uM(k+i-1) \in \Delta U$, $\forall i \in [0, N-1]$
$xM(k+N) \in X_f$, $uM(k+N-1) \in U_f$ provided that $x_M(k)$ represents a state variable of the mathematical model at a k-th step, $u_M(k)$ represents the model input at the k-th step, $\Delta u_M(k)$ represents the change rate of the model input at the k-th step, X represents a state restriction set, U represents a model input restriction set, $\Delta U$ represents a constraint set of the change rate of the model input, $X_f$ represents a terminal constraint set, $U_f$ represents a terminal model input constraint set, Q represents a state weight, R represents an input weight, $P_N$ represents a terminal weight, and N represents a horizon.

\* \* \* \* \*